(12) United States Patent
Zhang

(10) Patent No.: US 10,123,296 B2
(45) Date of Patent: Nov. 6, 2018

(54) METHOD AND APPARATUS FOR CONTROLLING BROADCAST PACKET SENDING FREQUENCY, AND TERMINAL

(71) Applicant: Huawei Technologies Co., Ltd., Shenzhen (CN)

(72) Inventor: Xiaoping Zhang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/519,062

(22) PCT Filed: Oct. 13, 2014

(86) PCT No.: PCT/CN2014/088453
§ 371 (c)(1),
(2) Date: Apr. 13, 2017

(87) PCT Pub. No.: WO2016/058117
PCT Pub. Date: Apr. 21, 2016

(65) Prior Publication Data
US 2017/0238274 A1    Aug. 17, 2017

(51) Int. Cl.
*H04W 64/00* (2009.01)
*H04W 72/00* (2009.01)
(Continued)

(52) U.S. Cl.
CPC .......... *H04W 64/00* (2013.01); *H04L 43/16* (2013.01); *H04W 28/10* (2013.01); *H04W 72/005* (2013.01); *H04W 88/02* (2013.01)

(58) Field of Classification Search
CPC ... H04W 64/00; H04W 72/005; H04W 28/10; H04W 88/02; H04L 43/16
See application file for complete search history.

(56) References Cited

U.S. PATENT DOCUMENTS 8,463,270 B2 * 6/2013 Thorson ............ H04W 36/0055
370/338
2006/0083243 A1    4/2006 Igarashi et al.
(Continued)

FOREIGN PATENT DOCUMENTS

CN    1761242 A    4/2006
CN    1812387 A    8/2006
(Continued)

OTHER PUBLICATIONS

Foreign Communication From a Counterpart Application, European Application No. 14903881.2, Extended European Search Report dated Sep. 27, 2017, 9 pages.
(Continued)

*Primary Examiner* — Khai M Nguyen
(74) *Attorney, Agent, or Firm* — Conley Rose, P.C.

(57) ABSTRACT

A method includes receiving, in at least one broadcast receiving period, a broadcast packet sent by another terminal; determining, according to the broadcast packet sent by the another terminal, a channel environment parameter of an area in which the terminal is located, where the channel environment parameter includes packet time density and/or a packet sending success rate; and determining, according to the channel environment parameter, a sending frequency for sending a broadcast packet in a broadcast sending period after the at least one broadcast receiving period by the terminal.

20 Claims, 8 Drawing Sheets

(51) Int. Cl.
*H04W 28/10* (2009.01)
*H04L 12/26* (2006.01)
*H04W 88/02* (2009.01)

(56) References Cited

U.S. PATENT DOCUMENTS

| | | | |
|---|---|---|---|
| 2007/0153719 A1* | 7/2007 | Gopal | H04W 48/12 370/328 |
| 2011/0044172 A1 | 2/2011 | Yim et al. | |
| 2011/0092212 A1 | 4/2011 | Kubota | |
| 2011/0122834 A1 | 5/2011 | Walker et al. | |
| 2012/0157090 A1* | 6/2012 | Kim | H04W 24/08 455/424 |
| 2012/0236746 A1 | 9/2012 | Nagai et al. | |
| 2013/0157652 A1* | 6/2013 | Khaitan | H04W 52/16 455/422.1 |
| 2014/0241175 A1* | 8/2014 | Schell | H04W 4/023 370/252 |
| 2015/0131506 A1 | 5/2015 | Dai et al. | |
| 2017/0026935 A1* | 1/2017 | Zhang | H04W 4/06 |

FOREIGN PATENT DOCUMENTS

| | | |
|---|---|---|
| CN | 1867108 A | 11/2006 |
| CN | 1963561 A | 5/2007 |
| CN | 102067682 A | 5/2011 |
| CN | 103581860 A | 2/2014 |
| EP | 2204925 A1 | 7/2010 |
| EP | 2271008 A1 | 1/2011 |
| JP | 2009212954 A | 9/2009 |
| JP | 2011045047 A | 3/2011 |
| JP | 2014017455 A | 1/2014 |
| JP | 2015144393 A | 8/2015 |
| WO | 2011145345 A1 | 11/2011 |
| WO | 2013126759 A2 | 8/2013 |

OTHER PUBLICATIONS

Machine Translation and Abstract of Chinese Publication No. CN1812387, Aug. 2, 2006, 11 pages.
Machine Translation and Abstract of Chinese Publication No. CN1867108, Nov. 22, 2006, 10 pages.
Machine Translation and Abstract of Chinese Publication No. CN1963561, May 16, 2007, 14 pages.
Foreign Communication From a Counterpart Application, PCT Application No. PCT/CN2014/088453, English Translation of International Search Report dated May 6, 2015, 2 pages.
Foreign Communication From a Counterpart Application, PCT Application No. PCT/CN2014/088453, English ranslation of Written Opinion dated May 6, 2015, 5 pages.
Machine Translation and Abstract of Japanese Publication No. JP2009212954, Sep. 17, 2009, 17 pages.
Machine Translation and Abstract of Japanese Publication No. JP2014017455, Jan. 30, 2014, 16 pages.
Machine Translation and Abstract of Japanese Publication No. JP2015144393, Aug. 6, 2015, 15 pages.
Foreign Communication From a Counterpart Application, Japanese Application No. 2017-518108, Japanese Office Action dated May 22, 2018, 2 pages.
Foreign Communication From a Counterpart Application, Japanese Application No. 2017-518108, English Translation of Japanese Office Action dated May 22, 2018, 3 pages.

* cited by examiner

METHOD AND APPARATUS FOR CONTROLLING BROADCAST PACKET SENDING FREQUENCY, AND TERMINAL

CROSS-REFERENCE TO RELATED APPLICATIONS

This application is a national stage of International Application No. PCT/CN2014/088453, filed on Oct. 13, 2014, which is hereby in cooperated by reference in its entirety.

TECHNICAL FIELD

The present disclosure relates to the field of wireless positioning technologies, and in particular, to a method and an apparatus for controlling a broadcast packet sending frequency, and a terminal.

BACKGROUND

Wireless positioning technologies have been widely applied to fields such as outdoor positioning, indoor positioning, and a location based service (LBS).

In a network-centric wireless positioning technology, a common network architecture usually includes a terminal to be positioned; and a network device and a server that are used to implement a positioning function. Communication between the terminal and the network device is performed by using a wireless network. Communication between network devices and communication between the network device and the server are performed by using a wired or wireless network. The terminal continuously sends a broadcast packet according to a specified sending frequency. After receiving the broadcast packet sent by the terminal, the network device extracts a related parameter (such as a device identity of the terminal) from the broadcast packet, and measures physical quantities used to calculate a terminal location, such as a received signal strength indicator (RSSI) and an angle of arrival (AOA). Then, the network device sends the foregoing information to the server. The server calculates location coordinates of the terminal according to these parameters.

In a process of implementing the present disclosure, the inventor finds that the foregoing technology has at least the following problem that the sending frequency for sending a broadcast packet by the terminal is preset and lacks flexibility.

SUMMARY

To resolve the problem, in the foregoing technology, that the sending frequency for sending a broadcast packet by the terminal is preset and lacks flexibility, embodiments of the present disclosure provide a method and an apparatus for controlling a broadcast packet sending frequency, and a terminal. The technical solutions are as follows.

According to a first aspect, a method for controlling a broadcast packet sending frequency is provided, where the method is applied to a terminal, the terminal is configured to receive a broadcast packet in a broadcast receiving period and send a broadcast packet in a broadcast sending period, and the method includes receiving, in at least one broadcast receiving period, a broadcast packet sent by another terminal; determining, according to the broadcast packet sent by the another terminal, a channel environment parameter of an area in which the terminal is located, where the channel environment parameter includes packet time density and/or a packet sending success rate; and determining a first sending frequency according to the channel environment parameter, where the first sending frequency is a sending frequency for sending a broadcast packet in a broadcast sending period after the at least one broadcast receiving period by the terminal.

In a first possible implementation manner of the first aspect, the channel environment parameter includes only the packet time density; and the determining a first sending frequency according to the channel environment parameter includes using a sending frequency higher than a second sending frequency as the first sending frequency when the packet time density is less than a first density threshold; or using a sending frequency lower than a second sending frequency as the first sending frequency when the packet time density is greater than a second density threshold; where the second sending frequency is a sending frequency for sending a broadcast packet in a broadcast sending period before the at least one broadcast receiving period by the terminal, and the first density threshold is less than or equal to the second density threshold.

With reference to the first aspect, in a second possible implementation manner of the first aspect, the channel environment parameter includes only the packet sending success rate; and the determining a first sending frequency according to the channel environment parameter includes using a sending frequency higher than a second sending frequency as the first sending frequency when the packet sending success rate is greater than a first success rate threshold; or using a sending frequency lower than a second sending frequency as the first sending frequency when the packet sending success rate is less than a second success rate threshold; where the second sending frequency is a sending frequency for sending a broadcast packet in a broadcast sending period before the at least one broadcast receiving period by the terminal, and the first success rate threshold is greater than or equal to the second success rate threshold.

With reference to the first aspect, in a third possible implementation manner of the first aspect, the channel environment parameter includes the packet time density and the packet sending success rate; and the determining a first sending frequency according to the channel environment parameter includes using a sending frequency higher than a second sending frequency as the first sending frequency when the packet time density is less than a first density threshold and the packet sending success rate is greater than a first success rate threshold; or using a sending frequency lower than a second sending frequency as the first sending frequency when the packet time density is greater than a second density threshold and/or the packet sending success rate is less than a second success rate threshold; where the second sending frequency is a sending frequency for sending a broadcast packet in a broadcast sending period before the at least one broadcast receiving period by the terminal, the first density threshold is less than or equal to the second density threshold, and the first success rate threshold is greater than or equal to the second success rate threshold.

With reference to the first aspect, in a fourth possible implementation manner of the first aspect, the determining a first sending frequency according to the channel environment parameter includes determining, according to a frequency parameter carried in a broadcast packet sent by each of other terminals, a sending frequency for sending a broadcast packet by each of the other terminals; and determining the first sending frequency according to the channel environment parameter, a second sending frequency, and the sending frequency of each of the other terminals; where the second sending frequency is a sending frequency for sending a broadcast packet in a broadcast sending period before the at least one broadcast receiving period by the terminal.

With reference to the fourth possible implementation manner of the first aspect, in a fifth possible implementation manner of the first aspect, the channel environment parameter includes only the packet time density; and the determining the first sending frequency according to the channel environment parameter, a second sending frequency, and the sending frequency of each of the other terminals includes using a sending frequency higher than the second sending frequency as the first sending frequency when the packet time density is less than a third density threshold and the second sending frequency is not higher than a sending frequency of any of the other terminals; or using a sending frequency lower than the second sending frequency as the first sending frequency when the packet time density is greater than a fourth density threshold and the second sending frequency is not lower than a sending frequency of any of the other terminals; where the third density threshold is less than or equal to the fourth density threshold.

With reference to the fourth possible implementation manner of the first aspect, in a sixth possible implementation manner of the first aspect, the channel environment parameter includes only the packet sending success rate; and the determining the first sending frequency according to the channel environment parameter, a second sending frequency, and the sending frequency of each of the other terminals includes using a sending frequency higher than the second sending frequency as the first sending frequency when the packet sending success rate is greater than a third success rate threshold and the second sending frequency is not higher than a sending frequency of any of the other terminals; or using a sending frequency lower than the second sending frequency as the first sending frequency when the packet sending success rate is less than a fourth success rate threshold and the second sending frequency is not lower than a sending frequency of any of the other terminals; where the third success rate threshold is greater than or equal to the fourth success rate threshold.

With reference to the fourth possible implementation manner of the first aspect, in a seventh possible implementation manner of the first aspect, the channel environment parameter includes the packet time density and the packet sending success rate; and the determining the first sending frequency according to the channel environment parameter, a second sending frequency, and the sending frequency of each of the other terminals includes using a sending frequency higher than the second sending frequency as the first sending frequency when the packet time density is less than a third density threshold, the packet sending success rate is greater than a third success rate threshold, and the second sending frequency is not higher than a sending frequency of any of the other terminals; or using a sending frequency lower than the second sending frequency as the first sending frequency when the packet time density is greater than a fourth density threshold and/or the packet sending success rate is less than a fourth success rate threshold, and the second sending frequency is not lower than a sending frequency of any of the other terminals; where the third density threshold is less than or equal to the fourth density threshold, and the third success rate threshold is greater than or equal to the fourth success rate threshold.

With reference to the first possible implementation manner of the first aspect, the third possible implementation manner of the first aspect, the fourth possible implementation manner of the first aspect, the fifth possible implementation manner of the first aspect, or the seventh possible implementation manner of the first aspect, in an eighth possible implementation manner of the first aspect, the channel environment parameter includes the packet time density; and the determining, according to the broadcast packet sent by the another terminal, a channel environment parameter of an area in which the terminal is located includes calculating the packet time density $\rho$ according to the following formula:

$$\rho = \frac{N_r}{T_r}$$

where $N_r$ represents a quantity of packet receiving times of the terminal in the at least one broadcast receiving period, and $T_r$ represents a receiving duration sum of the at least one broadcast receiving period.

With reference to the first aspect, the second possible implementation manner of the first aspect, the third possible implementation manner of the first aspect, the fourth possible implementation manner of the first aspect, the sixth possible implementation manner of the first aspect, or the seventh possible implementation manner of the first aspect, in a ninth possible implementation manner of the first aspect, the channel environment parameter includes the packet sending success rate; and the determining, according to the broadcast packet sent by the another terminal, a channel environment parameter of an area in which the terminal is located includes: determining, according to the broadcast packet sent by each of the other terminals, a theoretical quantity of packet sending times of each of the other terminals in the at least one broadcast receiving period; and calculating the packet sending success rate S according to the following formula:

$$S = \frac{N_r}{N_t} = \frac{N_r}{\sum_{j=1}^{P} N_{t(j)}}$$

where $N_r$ represents a quantity of packet receiving times of the terminal in the at least one broadcast receiving period; P indicates that the terminal receives broadcast packets from p other terminals in the at least one broadcast receiving period, P≥1, and P is an integer; j ∈ [1, P] and j is an integer; and $N_t$ represents a sum of theoretical quantities of packet sending times of the P other terminals in the at least one broadcast receiving period.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, or the ninth possible implementation manner of the first aspect, in a tenth possible implementation manner of the first aspect, the method further includes randomly determining sending duration of the broadcast sending period after the at least one broadcast receiving period; and sending a broadcast packet according to the first sending frequency and the sending duration after the at least one broadcast receiving period ends.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, or the tenth possible implementation manner of the first aspect, in an eleventh possible implementation manner of the first aspect, the method further includes: configuring receiving duration of each broadcast receiving period to be greater than a reciprocal of a preset minimum sending frequency, and configuring receiving duration of a broadcast receiving period of the terminal to be equal to receiving duration of a broadcast receiving period of the another terminal.

According to a second aspect, an apparatus for controlling a broadcast packet sending frequency is provided, where the apparatus is applied to a terminal, the terminal is configured to receive a broadcast packet in a broadcast receiving period and send a broadcast packet in a broadcast sending period, and the apparatus includes a packet receiving module configured to receive, in at least one broadcast receiving period, a broadcast packet sent by another terminal; a parameter determining module configured to determine, according to the broadcast packet sent by the another terminal, a channel environment parameter of an area in which the terminal is located, where the channel environment parameter includes packet time density and/or a packet sending success rate; and a frequency determining module configured to determine a first sending frequency according to the channel environment parameter, where the first sending frequency is a sending frequency for sending a broadcast packet in a broadcast sending period after the at least one broadcast receiving period by the terminal.

In a first possible implementation manner of the second aspect, the channel environment parameter includes only the packet time density; and the frequency determining module includes a first up adjustment unit and a first down adjustment unit; where the first up adjustment unit is configured to use a sending frequency higher than a second sending frequency as the first sending frequency when the packet time density is less than a first density threshold; and the first down adjustment unit is configured to use a sending frequency lower than a second sending frequency as the first sending frequency when the packet time density is greater than a second density threshold; where the second sending frequency is a sending frequency for sending a broadcast packet in a broadcast sending period before the at least one broadcast receiving period by the terminal, and the first density threshold is less than or equal to the second density threshold.

With reference to the second aspect, in a second possible implementation manner of the second aspect, the channel environment parameter includes only the packet sending success rate; and the frequency determining module includes a second up adjustment unit and a second down adjustment unit; where the second up adjustment unit is configured to use a sending frequency higher than a second sending frequency as the first sending frequency when the packet sending success rate is greater than a first success rate threshold; and the second down adjustment unit is configured to use a sending frequency lower than a second sending frequency as the first sending frequency when the packet sending success rate is less than a second success rate threshold; where the second sending frequency is a sending frequency for sending a broadcast packet in a broadcast sending period before the at least one broadcast receiving period by the terminal, and the first success rate threshold is greater than or equal to the second success rate threshold.

With reference to the second aspect, in a third possible implementation manner of the second aspect, the channel environment parameter includes the packet time density and the packet sending success rate; and the frequency determining module includes a third up adjustment unit and a third down adjustment unit; where the third up adjustment unit is configured to use a sending frequency higher than a second sending frequency as the first sending frequency when the packet time density is less than a first density threshold and the packet sending success rate is greater than a first success rate threshold; and the third down adjustment unit is configured to use a sending frequency lower than a second sending frequency as the first sending frequency when the packet time density is greater than a second density threshold and/or the packet sending success rate is less than a second success rate threshold; where the second sending frequency is a sending frequency for sending a broadcast packet in a broadcast sending period before the at least one broadcast receiving period by the terminal, the first density threshold is less than or equal to the second density threshold, and the first success rate threshold is greater than or equal to the second success rate threshold.

With reference to the second aspect, in a fourth possible implementation manner of the second aspect, the frequency determining module includes a frequency obtaining unit and a frequency determining unit; where the frequency obtaining unit is configured to determine, according to a frequency parameter carried in a broadcast packet sent by each of other terminals, a sending frequency for sending a broadcast packet by each of the other terminals; and the frequency determining unit is configured to determine the first sending frequency according to the channel environment parameter, a second sending frequency, and the sending frequency of each of the other terminals; where the second sending frequency is a sending frequency for sending a broadcast packet in a broadcast sending period before the at least one broadcast receiving period by the terminal.

With reference to the fourth possible implementation manner of the second aspect, in a fifth possible implementation manner of the second aspect, the channel environment parameter includes only the packet time density; and the frequency determining unit includes a first up adjustment subunit and a first down adjustment subunit; where the first up adjustment subunit is configured to use a sending frequency higher than the second sending frequency as the first sending frequency when the packet time density is less than a third density threshold and the second sending frequency is not higher than a sending frequency of any of the other terminals; and the first down adjustment subunit is configured to use a sending frequency lower than the second sending frequency as the first sending frequency when the packet time density is greater than a fourth density threshold and the second sending frequency is not lower than a sending frequency of any of the other terminals; where the third density threshold is less than or equal to the fourth density threshold.

With reference to the fourth possible implementation manner of the second aspect, in a sixth possible implementation manner of the second aspect, the channel environment parameter includes only the packet sending success rate; and the frequency determining unit includes a second up adjustment subunit and a second down adjustment subunit; where the second up adjustment subunit is configured to use a sending frequency higher than the second sending frequency as the first sending frequency when the packet sending success rate is greater than a third success rate threshold and the second sending frequency is not higher than a sending frequency of any of the other terminals; and the second down adjustment subunit is configured to use a sending frequency lower than the second sending frequency as the first sending frequency when the packet sending success rate is less than a fourth success rate threshold and the second sending frequency is not lower than a sending frequency of any of the other terminals; where the third success rate threshold is greater than or equal to the fourth success rate threshold.

With reference to the fourth possible implementation manner of the second aspect, in a seventh possible implementation manner of the second aspect, the channel environment parameter includes the packet time density and the packet sending success rate; and the frequency determining unit includes a third up adjustment subunit and a third down adjustment subunit; where the third up adjustment subunit is configured to use a sending frequency higher than the second sending frequency as the first sending frequency when the packet time density is less than a third density threshold, the packet sending success rate is greater than a third success rate threshold, and the second sending frequency is not higher than a sending frequency of any of the other terminals; and the third down adjustment subunit is configured to use a sending frequency lower than the second sending frequency as the first sending frequency when the packet time density is greater than a fourth density threshold and/or the packet sending success rate is less than a fourth success rate threshold, and the second sending frequency is not lower than a sending frequency of any of the other terminals; where the third density threshold is less than or equal to the fourth density threshold, and the third success rate threshold is greater than or equal to the fourth success rate threshold.

With reference to the second aspect, the first possible implementation manner of the second aspect, the third possible implementation manner of the second aspect, the fourth possible implementation manner of the second aspect, the fifth possible implementation manner of the second aspect, or the seventh possible implementation manner of the second aspect, in an eighth possible implementation manner of the second aspect, the channel environment parameter includes the packet time density; and the parameter determining module includes a density calculation unit; where the density calculation unit is configured to calculate the packet time density $\rho$ according to the following formula:

$$\rho = \frac{N_r}{T_r}$$

where $N_r$ represents a quantity of packet receiving times of the terminal in the at least one broadcast receiving period, and $T_r$ represents a receiving duration sum of the at least one broadcast receiving period.

With reference to the second aspect, the second possible implementation manner of the second aspect, the third possible implementation manner of the second aspect, the fourth possible implementation manner of the second aspect, the sixth possible implementation manner of the second aspect, or the seventh possible implementation manner of the second aspect, in a ninth possible implementation manner of the second aspect, the channel environment parameter includes the packet sending success rate; and the parameter determining module includes a times determining unit and a success rate calculation unit; where the times determining unit is configured to determine, according to the broadcast packet sent by each of the other terminals, a theoretical quantity of packet sending times of each of the other terminals in the at least one broadcast receiving period; and the success rate calculation unit is configured to calculate the packet sending success rate S according to the following formula:

$$S = \frac{N_r}{N_t} = \frac{N_r}{\sum_{j=1}^{P} N_{t(j)}}$$

where $N_r$ represents a quantity of packet receiving times of the terminal in the at least one broadcast receiving period; P indicates that the terminal receives broadcast packets from p other terminals in the at least one broadcast receiving period, P≥1, and P is an integer; j ∈ [1, P] and j is an integer; and $N_t$ represents a sum of theoretical quantities of packet sending times of the P other terminals in the at least one broadcast receiving period.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, the eighth possible implementation manner of the second aspect, or the ninth possible implementation manner of the second aspect, in a tenth possible implementation manner of the second aspect, the apparatus further includes a duration determining module configured to randomly determine sending duration of the broadcast sending period after the at least one broadcast receiving period; and a packet sending module configured to send a broadcast packet according to the first sending frequency and the sending duration after the at least one broadcast receiving period ends.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, the eighth possible implementation manner of the second aspect, the ninth possible implementation manner of the second aspect, or the tenth possible implementation manner of the second aspect, in an eleventh possible implementation manner of the second aspect, the apparatus further includes a duration configuration module configured to configure receiving duration of each broadcast receiving period to be greater than a reciprocal of a preset minimum sending frequency, and configure receiving duration of a broadcast receiving period of the terminal to be equal to receiving duration of a broadcast receiving period of the another terminal.

According to a third aspect, a terminal is provided, where the terminal is configured to receive a broadcast packet in a broadcast receiving period and send a broadcast packet in a broadcast sending period; and the terminal includes a bus, and a processor, a memory, and a transceiver that communicate with each other by using the bus; where the memory is configured to store one or more instructions, and the one or more instructions are configured to be executed by the processor; the transceiver is configured to receive, in at least one broadcast receiving period, a broadcast packet sent by another terminal; the processor is configured to determine, according to the broadcast packet sent by the another terminal, a channel environment parameter of an area in which the terminal is located, where the channel environment parameter includes packet time density and/or a packet sending success rate; and the processor is further configured to determine a first sending frequency according to the channel environment parameter, where the first sending frequency is a sending frequency for sending a broadcast packet in a broadcast sending period after the at least one broadcast receiving period by the terminal.

In a first possible implementation manner of the third aspect, the channel environment parameter includes only the packet time density; and the determining a first sending frequency according to the channel environment parameter includes using a sending frequency higher than a second sending frequency as the first sending frequency when the packet time density is less than a first density threshold; or using a sending frequency lower than a second sending frequency as the first sending frequency when the packet time density is greater than a second density threshold; where the second sending frequency is a sending frequency for sending a broadcast packet in a broadcast sending period before the at least one broadcast receiving period by the terminal, and the first density threshold is less than or equal to the second density threshold.

With reference to the third aspect, in a second possible implementation manner of the third aspect, the channel environment parameter includes only the packet sending success rate; and the determining a first sending frequency according to the channel environment parameter includes using a sending frequency higher than a second sending frequency as the first sending frequency when the packet sending success rate is greater than a first success rate threshold; or using a sending frequency lower than a second sending frequency as the first sending frequency when the packet sending success rate is less than a second success rate threshold; where the second sending frequency is a sending frequency for sending a broadcast packet in a broadcast sending period before the at least one broadcast receiving period by the terminal, and the first success rate threshold is greater than or equal to the second success rate threshold.

With reference to the third aspect, in a third possible implementation manner of the third aspect, the channel environment parameter includes the packet time density and the packet sending success rate; and the determining a first sending frequency according to the channel environment parameter includes using a sending frequency higher than a second sending frequency as the first sending frequency when the packet time density is less than a first density threshold and the packet sending success rate is greater than a first success rate threshold; or using a sending frequency lower than a second sending frequency as the first sending frequency when the packet time density is greater than a second density threshold and/or the packet sending success rate is less than a second success rate threshold; where the second sending frequency is a sending frequency for sending a broadcast packet in a broadcast sending period before the at least one broadcast receiving period by the terminal, the first density threshold is less than or equal to the second density threshold, and the first success rate threshold is greater than or equal to the second success rate threshold.

With reference to the third aspect, in a fourth possible implementation manner of the third aspect, the determining a first sending frequency according to the channel environment parameter includes determining, according to a frequency parameter carried in a broadcast packet sent by each of other terminals, a sending frequency for sending a broadcast packet by each of the other terminals; and determining the first sending frequency according to the channel environment parameter, a second sending frequency, and the sending frequency of each of the other terminals; where the second sending frequency is a sending frequency for sending a broadcast packet in a broadcast sending period before the at least one broadcast receiving period by the terminal.

With reference to the fourth possible implementation manner of the third aspect, in a fifth possible implementation manner of the third aspect, the channel environment parameter includes only the packet time density; and the determining the first sending frequency according to the channel environment parameter, a second sending frequency, and the sending frequency of each of the other terminals includes: using a sending frequency higher than the second sending frequency as the first sending frequency when the packet time density is less than a third density threshold and the second sending frequency is not higher than a sending frequency of any of the other terminals; or using a sending frequency lower than the second sending frequency as the first sending frequency when the packet time density is greater than a fourth density threshold and the second sending frequency is not lower than a sending frequency of any of the other terminals; where the third density threshold is less than or equal to the fourth density threshold.

With reference to the fourth possible implementation manner of the third aspect, in a sixth possible implementation manner of the third aspect, the channel environment parameter includes only the packet sending success rate; and the determining the first sending frequency according to the channel environment parameter, a second sending frequency, and the sending frequency of each of the other terminals includes: using a sending frequency higher than the second sending frequency as the first sending frequency when the packet sending success rate is greater than a third success rate threshold and the second sending frequency is not higher than a sending frequency of any of the other terminals; or using a sending frequency lower than the second sending frequency as the first sending frequency when the packet sending success rate is less than a fourth success rate threshold and the second sending frequency is not lower than a sending frequency of any of the other terminals; where the third success rate threshold is greater than or equal to the fourth success rate threshold.

With reference to the fourth possible implementation manner of the third aspect, in a seventh possible implementation manner of the third aspect, the channel environment parameter includes the packet time density and the packet sending success rate; and the determining the first sending frequency according to the channel environment parameter, a second sending frequency, and the sending frequency of each of the other terminals includes using a sending frequency higher than the second sending frequency as the first sending frequency when the packet time density is less than a third density threshold, the packet sending success rate is greater than a third success rate threshold, and the second sending frequency is not higher than a sending frequency of any of the other terminals; or using a sending frequency lower than the second sending frequency as the first sending frequency when the packet time density is greater than a fourth density threshold and/or the packet sending success rate is less than a fourth success rate threshold, and the second sending frequency is not lower than a sending frequency of any of the other terminals; where the third density threshold is less than or equal to the fourth density threshold, and the third success rate threshold is greater than or equal to the fourth success rate threshold.

With reference to the third aspect, the first possible implementation manner of the third aspect, the third possible implementation manner of the third aspect, the fourth possible implementation manner of the third aspect, the fifth possible implementation manner of the third aspect, or the seventh possible implementation manner of the third aspect, in an eighth possible implementation manner of the third aspect, the channel environment parameter includes the packet time density; and the determining, according to the broadcast packet sent by the another terminal, a channel environment parameter of an area in which the terminal is located includes calculating the packet time density $\rho$ according to the following formula:

$$\rho = \frac{N_r}{T_r}$$

where $N_r$ represents a quantity of packet receiving times of the terminal in the at least one broadcast receiving period, and $T_r$ represents a receiving duration sum of the at least one broadcast receiving period.

With reference to the third aspect, the second possible implementation manner of the third aspect, the third possible implementation manner of the third aspect, the fourth possible implementation manner of the third aspect, the sixth possible implementation manner of the third aspect, or the seventh possible implementation manner of the third aspect, in a ninth possible implementation manner of the third aspect, the channel environment parameter includes the packet sending success rate; and the determining, according to the broadcast packet sent by the another terminal, a channel environment parameter of an area in which the terminal is located includes: determining, according to the broadcast packet sent by each of the other terminals, a theoretical quantity of packet sending times of each of the other terminals in the at least one broadcast receiving period; and calculating the packet sending success rate S according to the following formula:

$$S = \frac{N_r}{N_t} = \frac{N_r}{\sum_{j=1}^{P} N_{t(j)}}$$

where $N_r$ represents a quantity of packet receiving times of the terminal in the at least one broadcast receiving period; P indicates that the terminal receives broadcast packets from p other terminals in the at least one broadcast receiving period, P≥1, and P is an integer; j ∈ [1, P] and j is an integer; and $N_t$ represents a sum of theoretical quantities of packet sending times of the P other terminals in the at least one broadcast receiving period.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, the eighth possible implementation manner of the third aspect, or the ninth possible implementation manner of the third aspect, in a tenth possible implementation manner of the third aspect, the processor is further configured to randomly determine sending duration of the broadcast sending period after the at least one broadcast receiving period; and the transceiver is further configured to send a broadcast packet according to the first sending frequency and the sending duration after the at least one broadcast receiving period ends.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, the eighth possible implementation manner of the third aspect, the ninth possible implementation manner of the third aspect, or the tenth possible implementation manner of the third aspect, in an eleventh possible implementation manner of the third aspect, the processor is further configured to configure receiving duration of each broadcast receiving period to be greater than a reciprocal of a preset minimum sending frequency, and configure receiving duration of a broadcast receiving period of the terminal to be equal to receiving duration of a broadcast receiving period of the another terminal.

In the embodiments of the present disclosure, a terminal is configured to: receive a broadcast packet in a broadcast receiving period and send a broadcast packet in a broadcast sending period. The terminal receives, in at least one broadcast receiving period, a broadcast packet sent by another terminal; determines, according to the broadcast packet sent by the another terminal, a channel environment parameter of an area in which the terminal is located, where the channel environment parameter includes packet time density and/or a packet sending success rate; and then determines, according to the channel environment parameter, a sending frequency for sending a broadcast packet in a broadcast sending period after the at least one broadcast receiving period by the terminal. Therefore, the problem described in the background part that the sending frequency for sending a broadcast packet by the terminal lacks flexibility is resolved, the sending frequency is adaptively adjusted according to the channel environment parameter, and broadcast packet sending flexibility is improved.

BRIEF DESCRIPTION OF DRAWINGS

To describe the technical solutions in the embodiments of the present disclosure more clearly, the following briefly describes the accompanying drawings. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
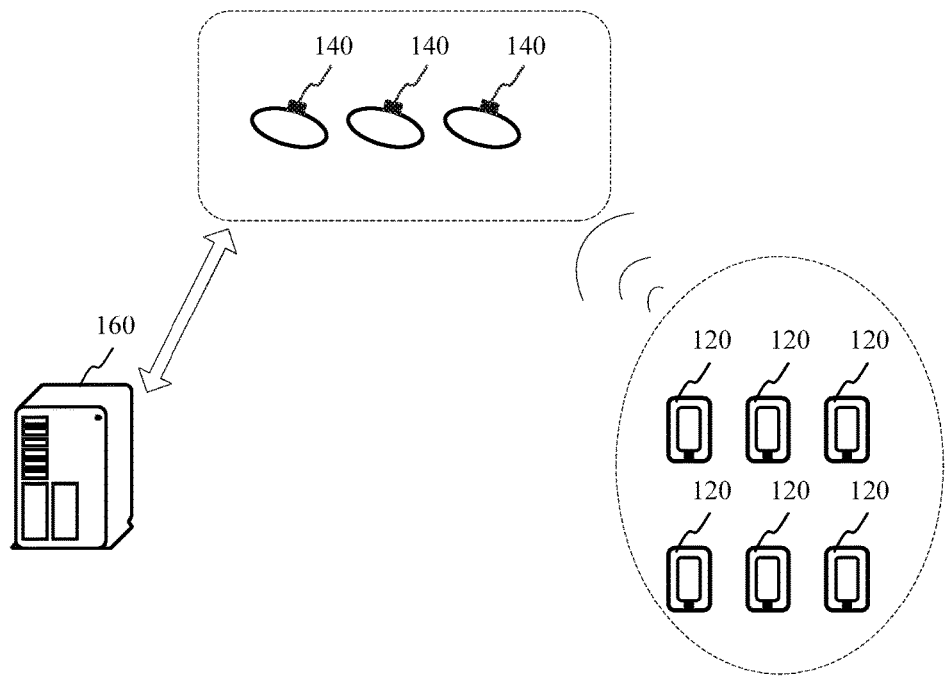
FIG. 1 is a schematic structural diagram of an implementation environment used in embodiments of the present disclosure.

Referring to FIG. 1, FIG. 1 shows a schematic structural diagram of an implementation environment used in the embodiments of the present disclosure. The implementation environment includes at least one terminal 120, at least one network device 140, and a server 160.

The terminal 120 may be various terminals that support a wireless broadcast positioning function. The terminal 120 may be a mobile terminal such as a mobile phone, a tablet computer, an electronic-book (e-book) reader, a personal digital assistant (PDA), or a laptop computer; or may be a wearable device such as a smart band, a smart watch, or a smart helmet; or may be a tag, a badge, or the like that can be installed on and carried by an object or that can be installed and carried by a user, or another wireless positioning device that is independent or can be integrated.

In a possible implementation manner, the terminal 120 may include a micro control unit (MCU) and a radio frequency (RF) wireless module connected to the micro control unit. The micro control unit is configured to control the radio frequency wireless module to transmit/receive a broadcast packet. Optionally, the terminal 120 may further include a timer implemented by using hardware, software, or a combination of hardware and software. The timer is integrated into the micro control unit, and is configured to record, manage, and control duration for transmitting/receiving a broadcast packet by the radio frequency wireless module.

The terminal 120 communicates with the at least one network device 140 by using a wireless network. A wireless network technology may be a technology such as Bluetooth® Low Energy (BLE), Wireless Fidelity (Wi-Fi, ZigBee®, radio frequency identification (RFID), or an ultra-wideband (UWB).

The terminal 120 sends, to the at least one network device 140 by using a wireless network, a broadcast packet used to implement positioning. Correspondingly, the network device 140 receives, by using the wireless network, the broadcast packet sent by the terminal 120.

The network device 140 may be various base station devices that can receive a broadcast packet sent by the terminal 120. For example, the network device 140 may be a locator. The locator may be installed on an infrastructure such as a wall, a rooftop, or a support. The network device 140 is configured to extract, from the received broadcast packet, a device address or a device identity (ID) corresponding to the terminal 120; and is further configured to measure physical quantities used to calculate location coordinates of the terminal 120, such as a received signal strength indicator and an angle of arrival.

The network device 140 communicates with the server 160 by using a wired network or a wireless network, and sends the device address or the device ID of the terminal 120 and the physical quantities to the server 160.

The server 160 may be a server, or a server cluster that includes several servers, or a cloud computing service center. The server 160 is configured to receive the device address or the device ID of the terminal 120 and the physical quantities used to calculate the location coordinates of the terminal 120, such as the received signal strength indicator and the angle of arrival, where the device address or the device ID of the terminal 120 and the physical quantities are sent by the network device 140; and calculate the location coordinates of the terminal 120 according to the foregoing information.

Before the embodiments of the present disclosure are described, some terms and concepts that are used in the embodiments of the present disclosure are first described herein. In the embodiments of the present disclosure:

1. A sending frequency refers to a theoretical value of a quantity of times for sending a broadcast packet per unit time. In the embodiments of the present disclosure, the "sending frequency" refers to a theoretical value rather than an actual value. The theoretical value of the sending frequency refers to a reference value or a guidance value for controlling, by an application-layer program of a terminal, an underlying module to send a broadcast packet.

The theoretical value of the sending frequency may be greater than or equal to the actual value It may be assumed that the theoretical value of the sending frequency is 5 times/second. The application-layer program of the terminal controls the underlying module to send a broadcast packet for five times per second. However, if the terminal cannot send a packet because the terminal fails to occupy a channel, or the terminal fails to send a packet because of another interference effect, the underlying module of the terminal may actually successfully send a broadcast packet for less than five times per second. For example, the theoretical value is 5 times/second, but the actual value may be only 4 times/second.

Similarly, a "theoretical quantity of packet sending times" is corresponding to the theoretical value of the sending frequency, and refers to a theoretical value rather than an actual value of a quantity of times for sending a broadcast packet in a time period. A "theoretical total quantity of packet sending times" is also corresponding to the theoretical value of the sending frequency, and refers to a theoretical value rather than an actual value of a total quantity of times for sending a broadcast packet in a broadcast sending period.

2. Packet time density refers to a total quantity of broadcast packets actually sent per unit time by all of other terminals in an area in which the terminal is located.

The packet time density is mainly used to measure base station load strength of network devices in the area in which the terminal is located. The base station load strength refers to load strength of the network devices used to perform wireless positioning on the terminal. For a network device, there is a positive correlation between base station load strength corresponding to the network device and a quantity of times for receiving a broadcast packet per unit time by the network device. A larger quantity of times for receiving a broadcast packet per unit time by the network device indicates higher base station load strength and higher power consumption caused per unit time by the network device. On the contrary, a smaller quantity of times for receiving a broadcast packet per unit time by the network device indicates lower base station load strength and lower power consumption caused per unit time by the network device.

3. A packet sending success rate refers to an average broadcast packet sending success rate of all of the other terminals in the area in which the terminal is located.

The packet sending success rate is mainly used to measure channel contention strength of the area in which the terminal is located. The channel contention strength refers to contention strength of a communications channel in a network in which terminals and network devices are located. There is a positive correlation between the channel contention strength and a quantity of times for sending a broadcast packet per unit time by the terminals. A larger quantity of times for sending a broadcast packet per unit time by the terminals indicates higher channel contention strength and a worse network environment. A smaller quantity of times for sending a broadcast packet per unit time by the terminals indicates lower channel contention strength and a better network environment.

4. An area in which the terminal is located refers to an area that includes other terminals that can communicate with the terminal to implement transmitting and receiving of broadcast packets. Generally, the area in which the terminal is located is a circular area around the terminal.

Figure 2:
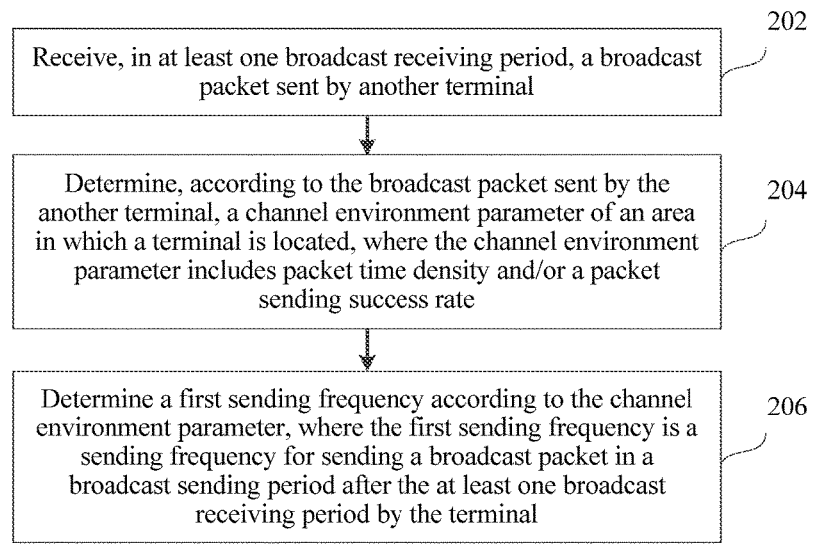
FIG. 2 is a method flowchart of a method for controlling a broadcast packet sending frequency according to an embodiment of the present disclosure.

Referring to FIG. 2, FIG. 2 shows a method flowchart of a method for controlling a broadcast packet sending frequency according to an embodiment of the present disclosure. In this embodiment, an example in which the method is applied to the terminal in the implementation environment shown in FIG. 1 is used for description. The terminal is configured to receive a broadcast packet in a broadcast receiving period and send a broadcast packet in a broadcast sending period. The method may include the following several steps.

Step 202: Receive, in at least one broadcast receiving period, a broadcast packet sent by another terminal.

Step 204: Determine, according to the broadcast packet sent by the another terminal, a channel environment parameter of an area in which the terminal is located, where the channel environment parameter includes packet time density and/or a packet sending success rate.

Step 206: Determine a first sending frequency according to the channel environment parameter, where the first sending frequency is a sending frequency for sending a broadcast packet in a broadcast sending period after the at least one broadcast receiving period by the terminal.

In conclusion, according to the method for controlling a broadcast packet sending frequency that is provided in this embodiment, a terminal is configured to receive a broadcast packet in a broadcast receiving period and send a broadcast packet in a broadcast sending period. A broadcast packet sent by another terminal is received in at least one broadcast receiving period; a channel environment parameter of an area in which the terminal is located is determined according to the broadcast packet sent by the another terminal, where the channel environment parameter includes packet time density and/or a packet sending success rate; and then a sending frequency for sending a broadcast packet in a broadcast sending period after the at least one broadcast receiving period by the terminal is determined according to the channel environment parameter. Therefore, the problem described in the background part that the sending frequency for sending a broadcast packet by the terminal lacks flexibility is resolved, the sending frequency is adaptively adjusted according to the channel environment parameter, and broadcast packet sending flexibility is improved.

Figure 3A:
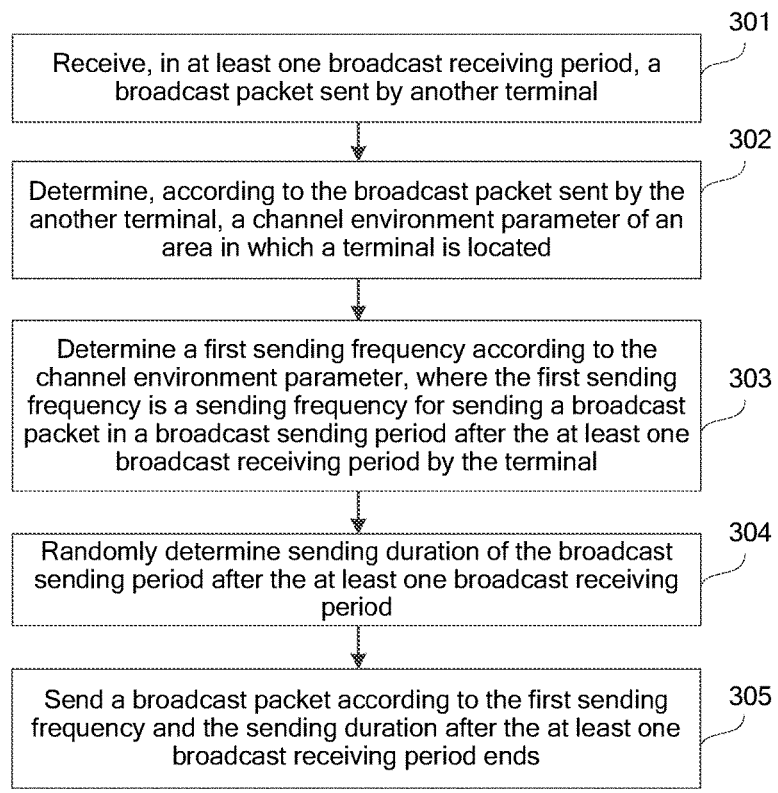
FIG. 3A is a method flowchart of a method for controlling a broadcast packet sending frequency according to another embodiment of the present disclosure.

Referring to FIG. 3A, FIG. 3A shows a method flowchart of a method for controlling a broadcast packet sending frequency according to another embodiment of the present disclosure. In this embodiment, an example in which the method is applied to the terminal in the implementation environment shown in FIG. 1 is used for description. The terminal is configured to receive a broadcast packet in a broadcast receiving period and send a broadcast packet in a broadcast sending period. The method may include the following several steps.

Step 301: Receive, in at least one broadcast receiving period, a broadcast packet sent by another terminal.

Figure 3B:
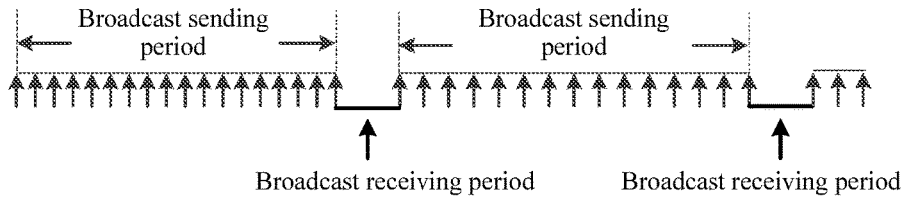
FIG. 3B is a schematic diagram of a broadcast receiving period and a broadcast sending period that are used in an embodiment of the present disclosure.

For any terminal, the terminal is configured to: receive a broadcast packet in a broadcast receiving period and send a broadcast packet in a broadcast sending period. In a broadcast sending period, the terminal sends a broadcast packet; and in a broadcast receiving period, the terminal receives a broadcast packet sent by another terminal in a surrounding area. As shown in FIG. 3B, FIG. 3B shows an example of a schematic diagram of a broadcast receiving period and a broadcast sending period. Broadcast receiving periods and broadcast sending periods alternate one after another.

When the terminal transmits/receives a broadcast packet by using different wireless network technologies, the terminal switches between the two working forms, that is, the broadcast receiving period and the broadcast sending period, in different manners. For example, when a wireless network technology used by the terminal is a BLE technology, if a generic access profile (GAP) layer of the terminal is configured to be in a broadcast mode, the terminal works in a broadcast sending period; or if a GAP layer of the terminal is configured to be in an observer mode, the terminal works in a broadcast receiving period. For another example, when a wireless network technology used by the terminal is a ZigBee technology, at any time, the terminal can send a broadcast packet to another terminal located in a same network, or receive a broadcast packet sent by another terminal located in a same network.

To enable different terminals to work asynchronously, and avoid an overlap between broadcast receiving periods and broadcast sending periods of the different terminals, sending duration $T_b$ of each broadcast sending period is randomly determined, receiving duration $T_r$ of each broadcast receiving period is configured to be a preset fixed value, and different terminals have same receiving duration in the broadcast receiving periods. The sending duration $T_b=T_c+T_o$, $T_c$ is a constant, $T_o$ may be a random number in an interval $[0,T_{om}]$, and $T_{om}$ is a preset maximum random number.

In addition, in a partial positioning area, when a terminal works in a broadcast receiving period, to ensure that each of other terminals in the positioning area can send a broadcast packet at least once in the broadcast receiving period, the receiving duration $T_r$ further needs to be configured to be greater than $1/f_{min}$ while different terminals are enabled to work asynchronously, where $f_{min}$ is a preset minimum sending frequency. However, to avoid that overlong receiving duration $T_r$ of the broadcast receiving period affects positioning of the terminal, a maximum value of the receiving duration $T_r$ may be further limited, or a maximum value of a ratio between the receiving duration $T_r$ and $T_c$ may be further limited.

Step 302: Determine, according to the broadcast packet sent by the another terminal, a channel environment parameter of an area in which the terminal is located.

The channel environment parameter is related to a quantity of broadcast packets sent per unit time by all of other terminals in the area in which the terminal is located. The channel environment parameter includes packet time density and/or a packet sending success rate. The packet time density is a total quantity of broadcast packets actually sent per unit time by all of the other terminals in the area in which the terminal is located, and the packet time density is mainly used to measure base station load strength of network devices in the area in which the terminal is located. The packet sending success rate is an average broadcast packet sending success rate of all of the other terminals in the area in which the terminal is located, and the packet sending success rate is mainly used to measure channel contention strength of the area in which the terminal is located.

In a possible implementation manner, the terminal calculates the packet time density ρ according to the following formula:

$$\rho = \frac{N_r}{T_r}$$

where $N_r$ represents a quantity of packet receiving times of the terminal in the at least one broadcast receiving period; $T_r$ represents a receiving duration sum of the at least one broadcast receiving period, and $$T_r = \sum_{k=1}^{Q} T_{r(k)};$$

Q represents a quantity of the at least one broadcast receiving period, $Q \geq 1$, and Q is an integer; $k \in [1, Q]$, and k is an integer; and $T_{r(k)}$ represents receiving duration of a $k^{th}$ broadcast receiving period.

It can be learned from the foregoing formula that $N_r$ represents a quantity of times for actually receiving a broadcast packet in Q broadcast receiving periods by the terminal, that is, a quantity of times for actually sending a broadcast packet in the Q broadcast receiving periods by the other terminals in the surrounding area. Larger packet time density ρ indicates higher base station load strength of the area in which the terminal is located. On the contrary, smaller packet time density ρ indicates lower base station load strength of the area in which the terminal is located.

In another possible calculation manner, the packet time density may be calculated according to a total quantity of broadcast packets actually received in the at least one broadcast receiving period by the terminal and the receiving duration sum of the at least one broadcast receiving period. In this embodiment, only an example in which sending a broadcast packet once is corresponding to one broadcast packet is used for description. No specific limitation is imposed herein.

A process in which the terminal calculates the packet sending success rate may include the following two steps: a first step and a second step.

First, a theoretical quantity of packet sending times of each of other terminals in the at least one broadcast receiving period is determined according to a broadcast packet sent by each of the other terminals.

When another terminal in a broadcast sending period sends a broadcast packet, the broadcast packet may carry a related parameter, so that after the terminal in the broadcast receiving period receives the broadcast packet, the terminal calculates, according to the related parameter carried in the broadcast packet, a theoretical quantity of packet sending times, of the another terminal in the broadcast sending period, in the broadcast receiving period of the terminal.

A $j^{th}$ another terminal in the area in which the terminal is located is used as an example. A theoretical quantity of packet sending times of the $j^{th}$ another terminal in the at least one broadcast receiving period of the terminal may be calculated by performing the following steps 1 to 4.

1. The terminal receives, in a kth broadcast receiving period of the at least one broadcast receiving period, a broadcast packet sent by the $j^{th}$ another terminal in the area in which the terminal is located; and the terminal determines, according to a frequency parameter carried in the broadcast packet sent by the $j^{th}$ another terminal, a sending frequency $f_{jk}$ of the $j^{th}$ another terminal in the $k^{th}$ broadcast receiving period.

The frequency parameter may be a sending frequency, or may be a frequency level.

In a first possible implementation manner, the frequency parameter is the sending frequency. The sending frequency is directly used as the sending frequency of the $j^{th}$ another terminal in the $k^{th}$ broadcast receiving period.

When another terminal in a broadcast sending period sends a broadcast packet, the another terminal may directly encapsulate, in the broadcast packet, a sending frequency of the another terminal in the broadcast sending period, so that the terminal in the broadcast receiving period directly reads the sending frequency. In the $k^{th}$ broadcast receiving period, the terminal receives the broadcast packet sent by the $j^{th}$ another terminal, and the broadcast packet carries the sending frequency $f_{jk}$. The terminal directly reads the sending frequency $f_{jk}$ from the broadcast packet.

In a second possible implementation manner, the frequency parameter is the frequency level. The frequency level is read from the broadcast packet sent by the $j^{th}$ another terminal, and the sending frequency of the $j^{th}$ another terminal in the $k^{th}$ broadcast receiving period is determined according to the frequency level.

Sending frequencies may be further pre-classified into different frequency levels. Different frequency levels are corresponding to different sending frequencies. When another terminal in a broadcast sending period sends a broadcast packet, the another terminal may encapsulate, in the broadcast packet, a frequency level of the another terminal in the broadcast sending period. After the terminal in the broadcast receiving period receives the broadcast packet, the terminal reads the frequency level from the broadcast packet and calculates the sending frequency according to a preset algorithm. In the $k^{th}$ broadcast receiving period, the terminal receives the broadcast packet sent by the $j^{th}$ another terminal, and the broadcast packet carries the frequency level. The terminal reads the frequency level from the broadcast packet and calculates the sending frequency $f_{jk}$ according to the frequency level.

Optionally, sending frequencies may be classified into different frequency levels in two manners: geometric classification and linear classification.

For example, the sending frequency $f_{jk}$ of the $j^{th}$ another terminal in the $k^{th}$ broadcast receiving period is calculated. When the geometric classification is used, the terminal may calculate the sending frequency $f_{jk}$ according to a frequency level m by using a first preset algorithm. The first preset algorithm is as follows:

$$f_{jk} = \frac{f_{max}}{a^{M-m}},$$

where a is a proportional coefficient, and a>0; M represents a total quantity of frequency levels, M≥2, and M is an integer; and $f_{max}$ represents a preset maximum sending frequency.

It is assumed that the total quantity M of frequency levels is preset to be equal to 4, the proportional coefficient a=2, and $f_{max}$=4 p/s (times/second), a correspondence between each frequency level and a sending frequency is shown in the following Table 1.

TABLE 1

| Frequency level | Sending frequency (p/s) |
| --- | --- |
| 1 | 0.5 |
| 2 | 1 |
| 3 | 2 |
| 4 | 4 |

When a sending frequency variation range needs to be extended, a value of the proportional coefficient a may be increased. On the contrary, when a sending frequency variation range needs to be narrowed, a value of the proportional coefficient a may be decreased. In addition, $f_{max}$ is the preset maximum sending frequency, and the value may be set to an empirical value according to an actual situation.

For example, the sending frequency $f_{jk}$ of the $j^{th}$ another terminal in the $k^{th}$ broadcast receiving period is calculated. When the linear classification is used, the terminal may calculate the sending frequency $f_{jk}$ according to a frequency level m by using a second preset algorithm. The second preset algorithm is as follows:

$$f_{jk} = f_{min} + \frac{(f_{max} - f_{min}) \times (m-1)}{M-1},$$

where M represents a total quantity of frequency levels, M≥2, and M is an integer; $f_{max}$ represents a preset maximum sending frequency; and $f_{min}$ represents a preset minimum sending frequency.

It is assumed that the total quantity M of frequency levels is preset to be equal to 4, $f_{min}$=1 p/s, and $f_{max}$=4 p/s, a correspondence between each frequency level and a sending frequency is shown in the following Table 2.

TABLE 2

| Frequency level | Sending frequency (p/s) |
| --- | --- |
| 1 | 1 |
| 2 | 2 |
| 3 | 3 |
| 4 | 4 |

$f_{max}$ is the preset maximum sending frequency, and the value may be set to an empirical value according to an actual situation; and $f_{min}$ is the preset minimum sending frequency, and the value may be also set to an empirical value according to an actual situation.

2. Duration $\Delta t_{jk}$ of an overlapped time period between the $k^{th}$ broadcast receiving period and a broadcast sending period corresponding to the $j^{th}$ another terminal is calculated according to duration parameters carried in the broadcast packet sent by the $j^{th}$ another terminal.

In this embodiment, an example in which the duration parameters carried in the broadcast packet include a theoretical total quantity of packet sending times in a broadcast sending period corresponding to another terminal and a sending sequence number corresponding to the broadcast packet is used for description.

When another terminal in a broadcast sending period sends a broadcast packet, the another terminal encapsulates, in the to-be-sent broadcast packet, a theoretical total quantity N of packet sending times in the current broadcast sending period corresponding to the another terminal and a sending sequence number n corresponding to the to-be-sent broadcast packet, where 1≤n≤N, and n and N are integers. In addition, to enable the terminal in the broadcast receiving period to identify, after receiving the broadcast packet, the terminal that sends the broadcast packet, when the another terminal in the broadcast sending period sends the broadcast packet, the another terminal may further encapsulate a device identity of the another terminal in the to-be-sent broadcast packet. The device identity is used to identify a terminal, and is usually represented by using a device address or a device ID.

Correspondingly, after receiving a broadcast packet sent by each of the other terminals, the terminal may create an information table. The information table is used to record a device identity, a theoretical total quantity of packet sending times, a sending sequence number, and a frequency level (or a sending frequency) that are carried in the broadcast packet sent by each of the other terminals. For example, the information table may be shown in the following Table 3.

TABLE 3

| Sequence number | Device identity | Theoretical total quantity of packet sending times | Sending sequence number | Frequency level |
|---|---|---|---|---|
| 1 | 00 00 0A 01 | 20 | 4 | 4 |
| 2 | 00 00 0A 02 | 22 | 17 | 4 |
| 3 | 00 00 0A 03 | 20 | 11 | 4 |
| ... | ... | ... | ... | ... |

For any broadcast packet sent by another terminal, duration parameters carried in the broadcast packet include a theoretical total quantity N of packet sending times in a broadcast sending period corresponding to the another terminal and a sending sequence number n corresponding to the broadcast packet. In this case, the terminal may calculate, in the following manner, duration $\Delta t_{jk}$ of an overlapped time period between the $k^{th}$ broadcast receiving period and the broadcast sending period corresponding to the another terminal.

First, a terminal-side start sending moment $t_{sj}$ and a terminal-side end sending moment $t_{ej}$ that are of the broadcast sending period corresponding to the another terminal and that are relative to a terminal-side time are calculated according to the theoretical total quantity N of packet sending times, the sending sequence number n, and a terminal-side receiving moment $t_r$ that is relative to the terminal-side time and at which the terminal receives the broadcast packet:

$$t_{sj} = t_r - (n-1) \times \frac{1}{f_j}, \text{ and } t_{ej} = t_r + (N-n) \times \frac{1}{f_j}$$

where $f_j$ represents the sending frequency corresponding to the $j^{th}$ another terminal;

$$\frac{1}{f_j}$$

represents a time interval between two consecutive times for sending a broadcast packet; and $t_r$ represents a local time at which the terminal receives the broadcast packet, that is, the terminal-side receiving moment.

Then, the duration $\Delta t_{jk}$ of the overlapped time period is calculated according to the terminal-side start sending moment $t_{sj}$, the terminal-side end sending moment $t_{ej}$, and a terminal-side start receiving moment $t_{sr}$ and a terminal-side end receiving moment $t_{er}$ that are of the $k^{th}$ broadcast receiving period and that are relative to the terminal-side time.

Figure 3C:
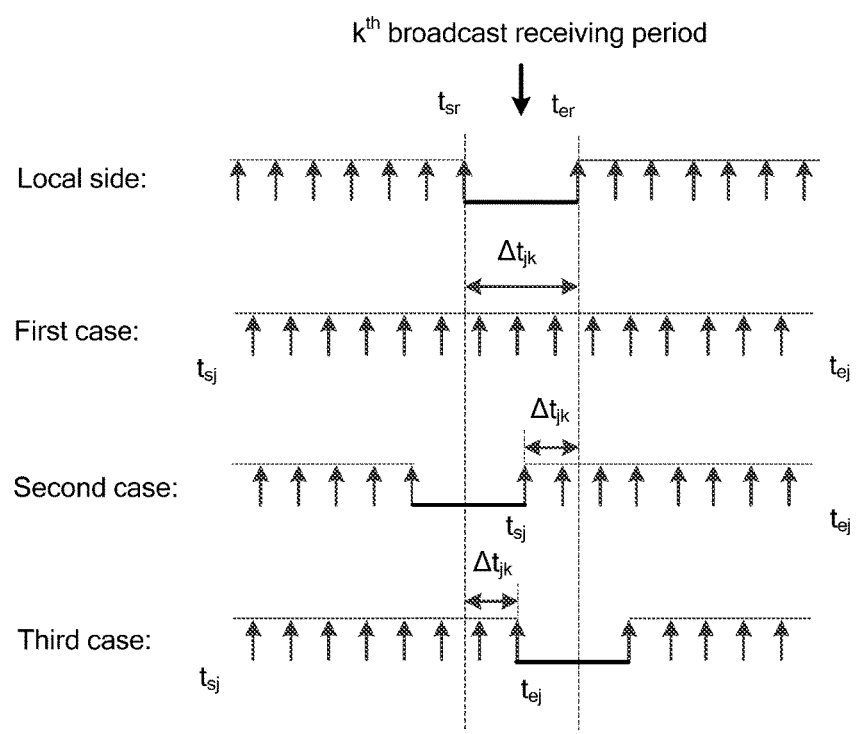
FIG. 3C is a schematic diagram of three possible cases used in calculating duration of an overlapped time period.

Referring to FIG. 3C, when the duration $\Delta t_{jk}$ of the overlapped time period is calculated, a value relationship among the foregoing four parameters $t_{sj}$, $t_{ej}$, $t_{sr}$, and $t_{er}$ may include the following three cases:

In a first case, when $t_{sj} \leq t_{sr} < t_{er} \leq t_{ej}$, the duration of the overlapped time period is calculated according to the following formula: $\Delta t_{jk} = t_{er} - t_{sr}$.

In a second case, when $t_{sr} < t_{sj} < t_{er} \leq t_{ej}$, the duration of the overlapped time period is calculated according to the following formula: $\Delta t_{jk} = t_{er} - t_{sj}$.

In a third case, when $t_{sj} \leq t_{sr} < t_{ej} < t_{er}$, the duration of the overlapped time period is calculated according to the following formula: $\Delta t_{jk} = t_{ej} - t_{sr}$.

3. A theoretical quantity $N_{t(jk)}$ of packet sending times of the $j^{th}$ another terminal in the $k^{th}$ broadcast receiving period is calculated according to the sending frequency $f_{jk}$ of the $j^{th}$ another terminal in the $k^{th}$ broadcast receiving period and the duration $\Delta t_{jk}$ of the corresponding overlapped time period.

The terminal may calculate the theoretical quantity $N_{t(jk)}$ of packet sending times of the $j^{th}$ another terminal in the $k^{th}$ broadcast receiving period with reference to the following three elements: the value relationship among the foregoing four parameters $t_{sj}$, $t_{ej}$, $t_{sr}$, and $t_{er}$; whether the terminal receives, at a start moment or an end moment of the $k^{th}$ broadcast receiving period, a broadcast packet sent by the $j^{th}$ another terminal; and whether the $j^{th}$ another terminal sends a broadcast packet at a start moment or an end moment of the broadcast sending period corresponding to the $j^{th}$ another terminal.

Referring to FIG. 3C, in a calculation manner used as an example, for the $j^{th}$ another terminal, if it is pre-configured that the $j^{th}$ another terminal sends a broadcast packet at both the start moment and the end moment of the broadcast sending period corresponding to the $j^{th}$ another terminal, the theoretical quantity $N_{t(jk)}$ of packet sending times of the $j^{th}$ another terminal in the $k^{th}$ broadcast receiving period has the following several possibilities.

(1) If $t_{sj} < t_{sr} < t_{er} < t_{ej}$, and the terminal does not receive, at the start moment or the end moment of the $k^{th}$ broadcast receiving period, a broadcast packet sent by the $j^{th}$ another terminal, the theoretical quantity $N_{t(jk)}$ of packet sending times of the $j^{th}$ another terminal in the $k^{th}$ broadcast receiving period is calculated according to the following formula:

$$N_{t(jk)} = [\Delta t_{jk} \times f_{jk}].$$

(2) If $t_{sj} < t_{sr} < t_{er} < t_{ej}$, and the terminal receives, at the start moment and/or the end moment of the $k^{th}$ broadcast receiving period, broadcast packets or a broadcast packet sent by the $j^{th}$ another terminal, the theoretical quantity $N_{t(jk)}$ of packet sending times of the $j^{th}$ another terminal in the $k^{th}$ broadcast receiving period is calculated according to the following formula:

$$N_{t(jk)} = [\Delta t_{jk} \times f_{jk}] + 1.$$

(3) If $t_{sr} < t_{sj} < t_{er} < t_{ej}$, regardless of whether the terminal receives, at the end moment of the $k^{th}$ broadcast receiving period, a broadcast packet sent by the $j^{th}$ another terminal, the theoretical quantity $N_{t(jk)}$ of packet sending times of the $j^{th}$ another terminal in the $k^{th}$ broadcast receiving period is calculated according to the following formula:

$$N_{t(jk)} = [\Delta t_{jk} \times f_{jk}] + 1.$$

(4) If $t_{sj} < t_{sr} < t_{ej} < t_{er}$, regardless of whether the terminal receives, at the start moment of the $k^{th}$ broadcast receiving period, a broadcast packet sent by the $j^{th}$ another terminal, the theoretical quantity $N_{t(jk)}$ of packet sending times of the $j^{th}$ another terminal in the $k^{th}$ broadcast receiving period is calculated according to the following formula:

$$N_{t(jk)} = [\Delta t_{jk} \times f_{jk}] + 1$$

where "[ ]" is a rounding symbol; $\Delta t_{jk}$ represents the duration of the overlapped time period between the $k^{th}$ broadcast receiving period and the broadcast sending period corresponding to the $j^{th}$ another terminal; and $f_{jk}$ represents the sending frequency of the $j^{th}$ another terminal in the $k^{th}$ broadcast receiving period.

In the foregoing calculation process, only the calculation manner of calculating the theoretical quantity $N_{t(jk)}$ of packet sending times of the $j^{th}$ another terminal in the $k^{th}$ broadcast receiving period when it is pre-configured that the $j^{th}$ another terminal sends a broadcast packet at both the start moment and the end moment of the broadcast sending period corresponding to the $j^{th}$ another terminal is used as an example for description. The terminal may calculate the theoretical quantity of packet sending times of the $j^{th}$ another terminal in the $k^{th}$ broadcast receiving period with reference to the following three elements: the value relationship among the foregoing four parameters $t_{sj}$, $t_{ej}$, $t_{sr}$, and $t_{er}$; whether the terminal receives, at the start moment or the end moment of the $k^{th}$ broadcast receiving period, a broadcast packet sent by the $j^{th}$ another terminal; and whether the $j^{th}$ another terminal sends a broadcast packet at the start moment or the end moment of the broadcast sending period corresponding to the $j^{th}$ another terminal.

4. A theoretical quantity $N_{t(j)}$ of packet sending times of the $j^{th}$ another terminal in the at least one broadcast receiving period is calculated according to a theoretical quantity of packet sending times of the $j^{th}$ another terminal in each broadcast receiving period.

After obtaining, by means of calculation, the theoretical quantity $N_{t(jk)}$ of packet sending times of the $j^{th}$ another terminal in the $k^{th}$ broadcast receiving period, the terminal calculates, according to the following formula, the theoretical quantity $N_{t(j)}$ of packet sending times of the $j^{th}$ another terminal in the at least one broadcast receiving period:

$$N_{t(j)} = \sum_{k=1}^{Q} N_{t(jk)}$$

where Q represents the quantity of the at least one broadcast receiving period, $Q \geq 1$, and Q is an integer; and $k \in [1, Q]$, and k is an integer.

Second, the packet sending success rate is calculated according to the theoretical quantity of packet sending times of each of the other terminals in the at least one broadcast receiving period and a quantity of packet receiving times of the terminal in the at least one broadcast receiving period.

The terminal calculates the packet sending success rate S according to the following formula:

$$S = \frac{N_r}{N_t} = \frac{N_r}{\sum_{j=1}^{P} N_{t(j)}}$$

where $N_r$ represents a quantity of packet receiving times of the terminal in the at least one broadcast receiving period; P indicates that the terminal receives broadcast packets from p other terminals in the at least one broadcast receiving period, $P \geq 1$, and P is an integer; $j \in [1, P]$ and j is an integer; and $N_t$ represents a sum of theoretical quantities of packet sending times of the P other terminals in the at least one broadcast receiving period.

It can be learned from the foregoing formula that the packet sending success rate refers to the average broadcast packet sending success rate of the other terminals in the area in which the terminal is located, that is, refers to an average broadcast packet sending success rate of all of the other terminals that are in the area in which the terminal is located and that can exchange broadcast packets with the terminal. The "average success rate" is relative to all rather than one of the other terminals that are in the area in which the terminal is located and can exchange broadcast packets with the terminal.

It should be noted that, if the terminal receives, in a broadcast receiving period, multiple broadcast packets sent by a same another terminal, the terminal can calculate, according to only one of the multiple broadcast packets, a theoretical quantity of packet sending times and a sending frequency of the another terminal in the broadcast receiving period of the terminal, and can distinguish between the other terminals according to a device identity carried in the broadcast packet.

Step 303: Determine a first sending frequency according to the channel environment parameter, where the first sending frequency is a sending frequency for sending a broadcast packet in a broadcast sending period after the at least one broadcast receiving period by the terminal.

Referring to FIG. 3B, after determining, according to the broadcast packet received in the at least one broadcast receiving period, the channel environment parameter of the area in which the terminal is located, the terminal determines the sending frequency in the subsequent broadcast sending period according to the channel environment parameter.

(1). The quantity of the at least one broadcast receiving period may be 1, that is, Q=1. The terminal determines, according to a channel environment parameter determined in the broadcast receiving period, sending frequencies for sending a broadcast packet in one or more broadcast sending periods after the broadcast receiving period; or (2). The quantity of the at least one broadcast receiving period may be greater than 1, that is, Q>1. The terminal determines, according to channel environment parameters determined in two or more broadcast receiving periods, sending frequencies for sending a broadcast packet in one or more broadcast sending periods after the two or more broadcast receiving periods.

In a specific example, it is assumed that broadcast receiving periods and broadcast sending periods alternate one after another, the broadcast receiving periods are corresponding to sequence numbers 1, 3, 5, and 7, and the broadcast sending periods are corresponding to sequence numbers 2, 4, 6, and 8. The terminal may adjust a sending frequency in a broadcast sending period 2 according to a channel environment parameter determined in a broadcast receiving period 1, and adjust a sending frequency in a broadcast sending period 4 according to a channel environment parameter determined in a broadcast receiving period 3; and so on. Alternatively, the terminal may adjust a sending frequency in a broadcast sending period 4, a broadcast sending period 6, or another subsequent broadcast sending period according to channel environment parameters determined in a broadcast receiving period 1 and a broadcast receiving period 3; and so on. When the broadcast receiving periods and the broadcast sending periods alternate one after another, and the terminal adjusts a sending frequency in a next broadcast sending period of a broadcast receiving period according to a channel environment parameter determined in the broadcast receiving period, sensitivity of frequency adjustment is relatively high, and an adjustment effect is more obvious.

In addition, according to different types and quantities of parameters included in the channel environment parameter, the step includes the following three possible implementation manners.

In a first possible implementation manner, the channel environment parameter includes only the packet time density. In this case: (1). A sending frequency higher than a second sending frequency is used as the first sending frequency when the packet time density is less than a first density threshold; or (2). A sending frequency lower than a second sending frequency is used as the first sending frequency when the packet time density is greater than a second density threshold. The second sending frequency is a sending frequency for sending a broadcast packet in a broadcast sending period before the at least one broadcast receiving period by the terminal, and the first density threshold is less than or equal to the second density threshold.

Smaller packet time density $\rho$ indicates lower base station load strength of the area in which the terminal is located, and the sending frequency may be properly up adjusted. On the contrary, larger packet time density $\rho$ indicates higher base station load strength of the area in which the terminal is located, and the sending frequency may be properly down adjusted.

Optionally, the first density threshold $\rho_1$ may be less than the second density threshold $\rho_2$, or may be equal to the second density threshold $\rho_2$. If $\rho_1=\rho_2$, that is, only one density threshold is set, the sending frequency is up/down adjusted according to the foregoing two cases (1) and (2). If $\rho_1<\rho_2$, that is, two density thresholds are set, the sending frequency is up/down adjusted according to the foregoing two cases (1) and (2). However, when $\rho_1<\rho<\rho_2$, the terminal may use a sending frequency that is the same as the second sending frequency as the first sending frequency.

In addition, the terminal may up/down adjust the sending frequency according to a preset frequency adjustment range. Alternatively, according to a preset correspondence between a packet time density and a sending frequency, the terminal may query the correspondence according to the packet time density to determine the first sending frequency. Alternatively, the terminal may up/down adjust a frequency level by one according to a preset frequency level. The terminal may preset different adjustment policies according to requirements. This embodiment imposes no specific limitation herein.

In a second possible implementation manner, the channel environment parameter includes only the packet sending success rate. In this case: (1). A sending frequency higher than a second sending frequency is used as the first sending frequency when the packet sending success rate is greater than a first success rate threshold; or (2). A sending frequency lower than a second sending frequency is used as the first sending frequency when the packet sending success rate is less than a second success rate threshold. The second sending frequency is a sending frequency for sending a broadcast packet in a broadcast sending period before the at least one broadcast receiving period by the terminal, and the first success rate threshold is greater than or equal to the second success rate threshold.

A larger packet sending success rate S indicates lower channel contention strength of the area in which the terminal is located, and the sending frequency may be properly up adjusted. On the contrary, a smaller packet sending success rate S indicates higher channel contention strength of the area in which the terminal is located, and the sending frequency may be properly down adjusted.

Optionally, the first success rate threshold $S_1$ may be greater than the second success rate threshold $S_2$, or may be equal to the second success rate threshold $S_2$. If $S_1=S_2$, that is, only one success rate threshold is set, the sending frequency is up/down adjusted according to the foregoing two cases (1) and (2). If $S_1>S_2$, that is, two success rate thresholds are set, the sending frequency is up/down adjusted according to the foregoing two cases (1) and (2). However, when $S_1>S>S_2$, the terminal may use a sending frequency that is the same as the second sending frequency as the first sending frequency.

In addition, the terminal may up/down adjust the sending frequency according to a preset frequency adjustment range. Alternatively, according to a preset correspondence between a packet sending success rate and a sending frequency, the terminal may query the correspondence according to the packet sending success rate to determine the first sending frequency. Alternatively, the terminal may up/down adjust a frequency level by one according to a preset frequency level. The terminal may preset different adjustment policies according to requirements. This embodiment imposes no specific limitation herein.

In a third possible implementation manner, the channel environment parameter includes the packet time density and the packet sending success rate. In this case: (1). A sending frequency higher than a second sending frequency is used as the first sending frequency when the packet time density is less than a first density threshold and the packet sending success rate is greater than a first success rate threshold; or (2). A sending frequency lower than a second sending frequency is used as the first sending frequency when the packet time density is greater than a second density threshold and/or the packet sending success rate is less than a second success rate threshold. The second sending frequency is a sending frequency for sending a broadcast packet in a broadcast sending period before the at least one broadcast receiving period by the terminal, the first density threshold is less than or equal to the second density threshold, and the first success rate threshold is greater than or equal to the second success rate threshold.

When the packet time density $\rho$ is less than the first density threshold and the packet sending success rate S is greater than the first success rate threshold, it indicates that both the base station load strength and the channel contention strength of the area in which the terminal is located are relatively low, and the terminal properly up adjusts the sending frequency. When the packet time density $\rho$ is greater than the second density threshold and/or the packet sending success rate S is less than the second success rate threshold, it indicates that the base station load strength and/or the channel contention strength of the area in which the terminal is located are/is relatively high, and the terminal properly down adjusts the sending frequency.

Optionally, the first density threshold $\rho_1$ may be less than the second density threshold $\rho_2$, or may be equal to the second density threshold $\rho_2$; and the first success rate threshold $S_1$ may be greater than the second success rate threshold $S_2$, or may be equal to the second success rate threshold $S_2$. If $\rho_1=\rho_2$ and $S_1=S_2$, that is, only one density threshold and one success rate threshold are set, the sending frequency is up/down adjusted according to the foregoing two cases (1) and (2). If $\rho_1<\rho_2$ and $S_1>S_2$, that is, two density thresholds and two success rate thresholds are set, the sending frequency is up/down adjusted according to the foregoing two cases (1) and (2). However, in another case other than the foregoing two cases (1) and (2), the terminal may use a sending frequency that is the same as a sending frequency in a previous broadcast sending period as a sending frequency in a next broadcast sending period. The another case other than the foregoing two cases (1) and (2) includes: $\rho_1<\rho<\rho_2$ and $S>S_1$; $\rho_1<\rho<\rho_2$ and $S_1>S>S_2$; or $\rho<\rho_1$ and $S_1>S>S_2$.

In addition, the terminal may up/down adjust the sending frequency according to a preset frequency adjustment range. Alternatively, according to a preset correspondence among a packet time density, a packet sending success rate, and a sending frequency, the terminal may query the correspondence according to the packet time density and the packet sending success rate to determine the first sending frequency. Alternatively, the terminal may up/down adjust a frequency level by one according to a preset frequency level. The terminal may preset different adjustment policies according to requirements. This embodiment imposes no specific limitation herein.

It should be noted that, in this embodiment, only the foregoing three possible implementation manners are used as examples to describe adjustment of the sending frequency. Another possible frequency adjustment policy may be configured for the terminal. This embodiment imposes no specific limitation herein.

It should be further noted that, in the foregoing three possible implementation manners, neither a case in which the packet time density is equal to the first density threshold and/or the second density threshold nor a case in which the packet sending success rate is equal to the first success rate threshold and/or the second success rate threshold is considered, that is, a critical point case is not considered. A person skilled in the art may determine a sending frequency adjustment policy according to requirements. This can be easily figured out, based on this embodiment, by a person skilled in the art. Details are not described in this embodiment again.

After the terminal determines the first sending frequency and after the at least one broadcast receiving period ends, the terminal switches to the broadcast sending period, and sends a broadcast packet by using the determined first sending frequency. In addition, sending duration of the broadcast sending period may be determined by performing the following step 304.

Step 304: Randomly determine sending duration of the broadcast sending period after the at least one broadcast receiving period.

It has been described in the foregoing step 301 that the sending duration $T_b$ of each broadcast sending period is randomly determined, the sending duration $T_b=T_c+T_o$, $T_c$ is a constant, $T_o$ may be a random number in the interval $[0, T_{om}]$, and $T_{om}$ is the preset maximum random number.

It should be noted that the foregoing step 304 may be performed before step 301 to step 303, may be performed after step 301 to step 303, or may be performed together with step 301 to step 303. In this embodiment, that step 304 is performed after step 301 to step 303 is used as an example. No specific limitation is imposed herein.

Step 305: Send a broadcast packet according to the first sending frequency and the sending duration after the at least one broadcast receiving period ends.

The terminal determines, according to the first sending frequency, a quantity of times for sending a broadcast packet per unit time in the broadcast sending period, that is, a time interval for sending a broadcast packet. The terminal determines duration for sending a broadcast packet according to the sending duration.

A timer of the terminal records, manages, and controls duration for transmitting/receiving a broadcast packet by a radio frequency wireless module. When duration of the broadcast receiving period reaches preset receiving duration $T_r$, the timer sends an indication to a micro control unit of the terminal. After receiving the indication, the micro control unit controls the radio frequency wireless module to send a broadcast packet. In the broadcast sending period, the sending duration $T_b=T_c+T_o$, and the sending frequency is the first sending frequency determined according to the foregoing step 303.

In addition, when the terminal sends a broadcast packet, in addition to encapsulating, in the broadcast packet, related information used to implement positioning, the terminal further needs to encapsulate the following parameters in the broadcast packet. This step may include the following several sub-steps.

First, a theoretical total quantity N of packet sending times in the broadcast sending period after the at least one broadcast receiving period is calculated according to the first sending frequency and the sending duration, where N≥1, and N is an integer.

It is assumed that the first sending frequency is $f_b$ and the sending duration is $T_b$. The theoretical total quantity of packet sending times in the broadcast sending period is calculated according to the following formula:

$$N=f_b \times T_b+1.$$

In another possible implementation manner, the theoretical total quantity N of packet sending times in the broadcast sending period may be calculated according to the following formula: $N=f_b \times T_b$; or $N=f_b \times T_b-1$. Different algorithms may be selected according to whether the terminal sends a broadcast packet at a start moment or an end moment of the broadcast sending period.

Second, a broadcast packet that includes a device identity, the theoretical total quantity of packet sending times, a sending sequence number corresponding to the broadcast packet, and a frequency parameter is generated.

The frequency parameter may be a sending frequency, or may be a frequency level corresponding to a sending frequency. In addition, sending sequence numbers are usually counted from 1. Each time after the terminal sends a broadcast packet, a sending sequence number is increased by 1.

Third, the broadcast packet is sent.

After generating the broadcast packet that carries the foregoing parameters, the terminal sends the broadcast packet. Correspondingly, a network device in the surrounding area and another terminal in a broadcast receiving period receive the broadcast packet. The network device is configured to interact with a server according to the received broadcast packet, so as to complete positioning once. The another terminal in the broadcast receiving period is configured to determine, according to the received broadcast packet, the channel environment parameter of the area in which the another terminal is located, and then complete adaptive adjustment of the sending frequency.

Further, the timer of the terminal records, manages, and controls the duration for transmitting/receiving a broadcast packet by the radio frequency wireless module. When the duration of the broadcast sending period reaches the sending duration $T_b$, the timer sends an indication to the micro control unit of the terminal. After receiving the indication, the micro control unit controls the radio frequency wireless module to stop sending a broadcast packet, and a next broadcast receiving period starts. In the next broadcast receiving period, receiving duration is still $T_r$, and the foregoing step 301 to step 305 are repeatedly performed.

In conclusion, according to the method for controlling a broadcast packet sending frequency that is provided in this embodiment, a terminal is configured to receive a broadcast packet in a broadcast receiving period and send a broadcast packet in a broadcast sending period. The terminal receives, in at least one broadcast receiving period, a broadcast packet sent by another terminal; determines, according to the broadcast packet sent by the another terminal, a channel environment parameter of an area in which the terminal is located, where the channel environment parameter includes packet time density and/or a packet sending success rate;

and then determines, according to the channel environment parameter, a sending frequency for sending a broadcast packet in a broadcast sending period after the at least one broadcast receiving period by the terminal. Therefore, the problem described in the background part that the sending frequency for sending a broadcast packet by the terminal lacks flexibility is resolved, the sending frequency is adaptively adjusted according to the channel environment parameter, and broadcast packet sending flexibility is improved.

In addition, according to the method for controlling a broadcast packet sending frequency that is provided in this embodiment, the channel environment parameter is further represented by using the packet time density and/or the packet sending success rate. The packet time density and the packet sending success rate correlate with each other, but are different from each other to some extent. Both the packet time density and the packet sending success rate reflect, to some extent, a quantity of broadcast packets sent per unit time by other terminals in the area in which the terminal is located. The packet time density is mainly used to measure base station load strength. The packet sending success rate is mainly used to measure channel contention strength. The terminal adaptively adjusts the sending frequency in the subsequent broadcast sending period by using one or both of the foregoing two parameters measured in the broadcast receiving period, so as to balance energy consumption of network devices and prolong network lifetime while effectively controlling the base station load strength and the channel contention strength of the surrounding environment and ensuring positioning reliability and a positioning success rate.

In addition, this embodiment further provides two frequency level classification manners, and responding to adjustment of the sending frequency may be accelerated by setting different frequency levels. A linear classification manner may be used to make a sending frequency variation range relatively steady. A geometric classification manner may be used to make the sending frequency variation range relatively obvious. Different classification manners may be selected according to differing situations.

It should be further noted that if an initial working status of the terminal is a broadcast sending period, a sending frequency in the broadcast sending period may be preset according to present conditions. For example, the sending frequency may be set to a preset maximum sending frequency $f_{max}$.

Figure 4:
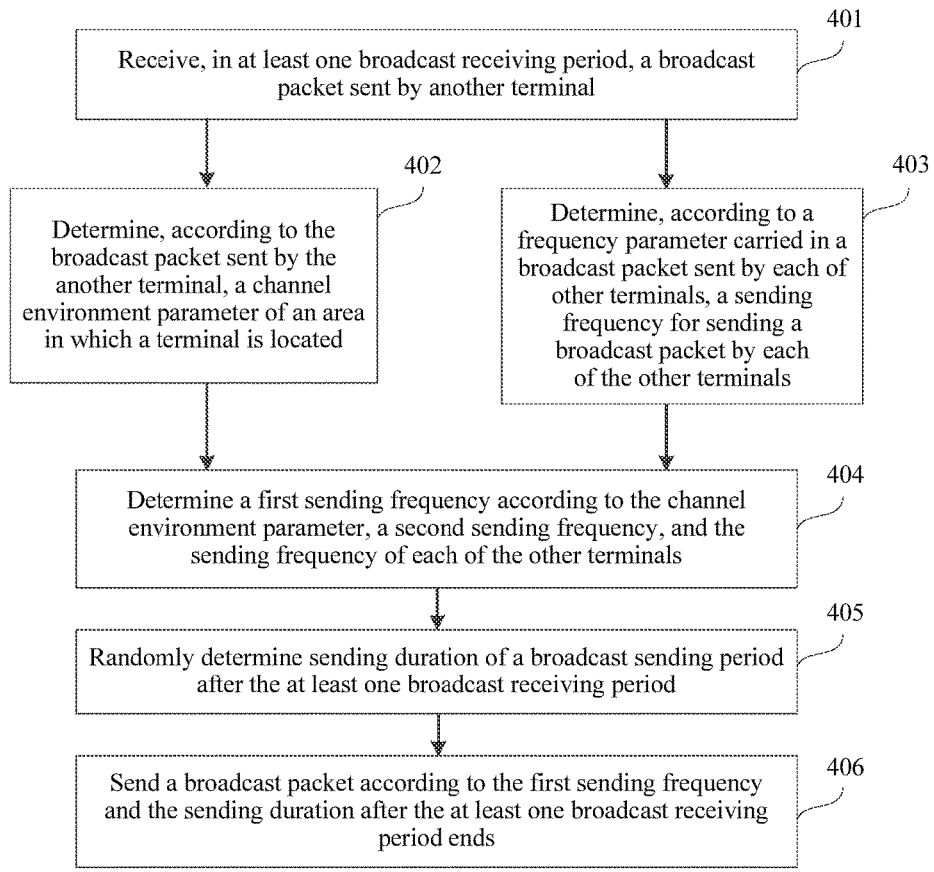
FIG. 4 is a method flowchart of a method for controlling a broadcast packet sending frequency according to still another embodiment of the present disclosure.

Referring to FIG. 4, FIG. 4 shows a method flowchart of a method for controlling a broadcast packet sending frequency according to another embodiment of the present disclosure. In this embodiment, an example in which the method is applied to the terminal in the implementation environment shown in FIG. 1 is still used for description. The terminal is configured to: receive a broadcast packet in a broadcast receiving period and send a broadcast packet in a broadcast sending period. The method may include the following several steps:

Step 401: Receive, in at least one broadcast receiving period, a broadcast packet sent by another terminal.

For any terminal, the terminal is configured to: receive a broadcast packet in a broadcast receiving period and send a broadcast packet in a broadcast sending period. Sending duration $T_b$ of each broadcast sending period is randomly determined, the sending duration $T_b=T_c+T_o$, $T_c$ is a constant, $T_o$ may be a random number in an interval [0, $T_{om}$], and $T_{om}$ is a preset maximum random number. Receiving duration $T_r$ of each broadcast receiving period is a preset fixed value, and different terminals have same receiving duration in broadcast receiving periods. The receiving duration $$T_r > \frac{1}{f_{min}},$$

and $f_{min}$ is a preset minimum sending frequency.

Step 402: Determine, according to the broadcast packet sent by the another terminal, a channel environment parameter of an area in which the terminal is located.

The channel environment parameter is related to a quantity of broadcast packets sent per unit time by all of other terminals in the area in which the terminal is located. The channel environment parameter includes packet time density and/or a packet sending success rate. The packet time density is a total quantity of broadcast packets actually sent per unit time by all of the other terminals in the area in which the terminal is located, and the packet time density is mainly used to measure base station load strength of network devices in the area in which the terminal is located. The packet sending success rate is an average broadcast packet sending success rate of all of the other terminals in the area in which the terminal is located, and the packet sending success rate is mainly used to measure channel contention strength of the area in which the terminal is located.

A process of calculating the packet time density ρ has been described in detail in the embodiment shown in FIG. 3A. For details, refer to the embodiment shown in FIG. 3A. Details are not described in this embodiment again.

A process in which the terminal calculates the packet sending success rate may include the following two steps: a first step and a second step.

First, a theoretical quantity of packet sending times of each of other terminals in the at least one broadcast receiving period is determined according to a broadcast packet sent by each of the other terminals.

Second, the packet sending success rate is calculated according to the theoretical quantity of packet sending times of each of the other terminals in the at least one broadcast receiving period and a quantity of packet receiving times of the terminal in the at least one broadcast receiving period.

A difference between this embodiment and the embodiment shown in FIG. 3A is as follows: In the embodiment shown in FIG. 3A, when the terminal calculates the duration $\Delta t_{jk}$ of the overlapped time period, the duration parameters include the theoretical total quantity of packet sending times in the broadcast sending period corresponding to the another terminal and the sending sequence corresponding to the broadcast packet. In this embodiment, an example in which duration parameters include an another-terminal-side start sending moment and an another-terminal-side end sending moment that are of a broadcast sending period corresponding to another terminal and that are relative to an another-terminal-side time, and an another-terminal-side sending moment of the broadcast packet is used for description.

When another terminal in a broadcast sending period sends a broadcast packet, the another terminal encapsulates, in the to-be-sent broadcast packet, an another-terminal-side start sending moment $t_{sj}'$ and an another-terminal-side end sending moment $t_{ej}'$ that are of the current corresponding broadcast sending period and that are relative to an another-terminal-side time, and an another-terminal-side sending moment $t_{bj}'$ that is of the to-be-sent broadcast packet and that is relative to the another-terminal-side time. That is, the foregoing $t_{sj}'$, $t_{ej}'$, and $t_{bj}'$ are determined by the another terminal in the broadcast sending period according to a local time corresponding to the another terminal.

In addition, to enable the terminal in the broadcast receiving period to identify, after receiving the broadcast packet, the terminal that sends the broadcast packet, when the another terminal in the broadcast sending period sends the broadcast packet, the another terminal may further encapsulate a device identity of the another terminal in the to-be-sent broadcast packet. The device identity is used to identify a terminal, and is usually represented by using a device address or a device ID.

Correspondingly, after receiving a broadcast packet sent by each of the other terminals, the terminal may create an information table. The information table is used to record a device identity, an another-terminal-side start sending moment $t_{sj}'$, an another-terminal-side end sending moment $t_{ej}'$, an another-terminal-side sending moment $t_{bj}'$ corresponding to the current broadcast packet, and a frequency level (or a sending frequency) that are carried in the broadcast packet sent by each of the other terminals. For example, the information table may be shown in the following Table 4.

TABLE 4

| Sequence number | Device identity | Another-terminal-side start sending moment | Another-terminal-side end sending moment | Another-terminal-side sending moment | Frequency level |
|---|---|---|---|---|---|
| 1 | 00 00 0A 01 | 00:20 | 00:50 | 00:24 | 3 |
| 2 | 00 00 0A 02 | 00:30 | 00:58 | 00:50 | 3 |
| 3 | 00 00 0A 03 | 00:28 | 00:62 | 00:44 | 4 |
| ... | ... | ... | ... | ... | ... |

For any broadcast packet sent by another terminal, duration parameters carried in the broadcast packet include an another-terminal-side start sending moment $t'_{sj}$ and an another-terminal-side end sending moment $t'_{ej}$ that are of a broadcast sending period corresponding to the another terminal and that are relative to an another-terminal-side time, and an another-terminal-side sending moment $t_{bj}'$ of the broadcast packet. In this case, the terminal may calculate, in the following manner, duration $\Delta t_{jk}$ of an overlapped time period between the $k^{th}$ broadcast receiving period and the broadcast sending period corresponding to the another terminal.

First, a terminal-side start sending moment $t_{sj}$ that is of a broadcast sending period corresponding to a $j^{th}$ another terminal and that is relative to a terminal-side time is calculated according to the another-terminal-side start sending moment $t_{sj}'$, the another-terminal-side sending moment $t_{bj}'$, and a terminal-side receiving moment $t_r$ that is relative to the terminal-side time and at which the terminal receives the broadcast packet:

$$t_{sj}=t_r-(t_{bj}'-t_{sj}').$$

The foregoing broadcast packet whose sequence number is 1 is used as an example. It is assumed that a terminal-side receiving moment $t_r$ at which the terminal receives the broadcast packet is 00:70, and the terminal-side receiving moment $t_r$ is determined by the terminal according to a local time of the terminal. The terminal-side start sending moment $t_{sj}$ that is of the broadcast sending period corresponding to the $j^{th}$ another terminal sending the broadcast packet and that is relative to the terminal-side time is calculated according to the following formula:

$$t_{sj}=t_r-(t_{bj}'-t_{sj}')=00:70-(00:24-00:20)=00:66.$$

Then, a terminal-side end sending moment $t_{ej}$ that is of the broadcast sending period corresponding to the $j^{th}$ another terminal and that is relative to the terminal-side time is calculated according to the another-terminal-side end sending moment $t_{ej}'$, the another-terminal-side sending moment $t_{bj}'$, and the terminal-side receiving moment $t_{ej}$ that is relative to the terminal-side time and at which the terminal receives the broadcast packet:

$$t_{ej}=t_r+(t_{ej}'-t_{bj}').$$

The foregoing broadcast packet whose sequence number is 1 is still used as an example. The terminal-side end sending moment that is of the broadcast sending period corresponding to the $j^{th}$ another terminal sending the broadcast packet and that is relative to the terminal side time is calculated according to the following formula:

$$t_{sj}=t_r-(t_{bj}'-t_{sj}')=00:70+(00:50-00:24)=00:90.$$

Finally, the duration $\Delta t_{jk}$ of the overlapped time period is calculated according to the terminal-side start sending moment $t_{sj}$, the terminal-side end sending moment $t_{ej}$, and a terminal-side start receiving moment $t_{sr}$ and a terminal-side end receiving moment $t_{er}$ that are of the current broadcast receiving period and that are relative to the terminal-side time.

Referring to FIG. 3C, when the duration $\Delta t_{jk}$ of the overlapped time period is calculated, a value relationship among the foregoing four parameters $t_{sj}$, $t_{ej}$, $t_{sr}$, and $t_{er}$ may include the following three cases:

In a first case, when $t_{sj}<t_{sr}<t_{er}<t_{ej}$, the duration of the overlapped time period is calculated according to the following formula:

$$\Delta t_{jk}=t_{er}-t_{sr}.$$

In a second case, when $t_{sr}<t_{sj}<t_{er}<t_{ej}$, the duration of the overlapped time period is calculated according to the following formula:

$$\Delta t_{jk}=t_{er}-t_{sj}.$$

In a third case, when $t_{sj}<t_{sr}<t_{ej}<t_{er}$, the duration of the overlapped time period is calculated according to the following formula:

$$\Delta t_{jk}=t_{ej}-t_{sr}.$$

A difference between this embodiment and the embodiment shown in FIG. 3A is as follows: In this embodiment, when adjusting a sending frequency, the terminal determines a first sending frequency in a subsequent broadcast sending period with reference to the channel environment parameter and a second sending frequency of the terminal in a broadcast sending period before the at least one broadcast receiving period. Details are as follows:

Step 403: Determine, according to a frequency parameter carried in a broadcast packet sent by each of other terminals, a sending frequency for sending a broadcast packet by each of the other terminals.

A process of determining a sending frequency of another terminal has been described in detail in step 302 in the embodiment shown in FIG. 3A. Details are not described in this embodiment again.

Step 404: Determine a first sending frequency according to the channel environment parameter, a second sending frequency, and the sending frequency of each of the other terminals.

The second sending frequency is a sending frequency for sending a broadcast packet in a broadcast sending period before the at least one broadcast receiving period by the terminal. According to different types and quantities of parameters included in the channel environment parameter, the step includes the following three possible implementation manners.

In a first possible implementation manner, the channel environment parameter includes only the packet time density. In this case: (1). A sending frequency higher than the second sending frequency is used as the first sending frequency when the packet time density is less than a third density threshold and the second sending frequency is not higher than a sending frequency of any of the other terminals; or (2). A sending frequency lower than the second sending frequency is used as the first sending frequency when the packet time density is greater than a fourth density threshold and the second sending frequency is not lower than a sending frequency of any of the other terminals. The third density threshold is less than or equal to the fourth density threshold.

Both the third density threshold and the fourth density threshold are preset empirical values. Smaller packet time density ρ indicates lower base station load strength of the area in which the terminal is located, and the sending frequency may be properly up adjusted. On the contrary, larger packet time density ρ indicates higher base station load strength of the area in which the terminal is located, and the sending frequency may be properly down adjusted.

In addition, to ensure that sending frequencies of terminals in the surrounding area are in a relatively balanced state and avoid that some terminals have excessively high sending frequencies, but some terminals have excessively low sending frequencies, before up adjusting a sending frequency, the terminal further needs to compare a sending frequency of the terminal in a previous broadcast sending period with sending frequencies of other terminals. When the sending frequency of the terminal in the previous broadcast sending period is not higher than a sending frequency of any of the other terminals, the terminal up adjusts the sending frequency. Otherwise, the previous sending frequency is still used, and another terminal whose sending frequency is lower up adjusts a sending frequency, so as to ensure that the sending frequencies of the terminals in the surrounding area are in a relatively balanced state.

Similarly, before down adjusting the sending frequency, the terminal further needs to compare a sending frequency of the terminal in a previous broadcast sending period with sending frequencies of the other terminals. When the sending frequency of the terminal in the previous broadcast sending period is not lower than a sending frequency of any of the other terminals, the terminal down adjusts the sending frequency. Otherwise, the previous sending frequency is still used, and another terminal whose sending frequency is higher down adjusts a sending frequency, so as to ensure that the sending frequencies of the terminals in the surrounding area are in a relatively balanced state.

Optionally, the third density threshold may be equal to the fourth density threshold, that is, only one density threshold is set. Alternatively, the third density threshold may be less than the fourth density threshold, that is, two density thresholds are set. In a possible embodiment, regardless of setting one density threshold or setting two density thresholds, in addition to the foregoing two cases (1) and (2), the terminal may use a sending frequency that is the same as the second sending frequency as the first sending frequency.

In addition, the terminal may up/down adjust the sending frequency according to a preset frequency adjustment range. Alternatively, according to a preset correspondence between a packet time density and a sending frequency, the terminal may query the correspondence according to the packet time density to determine the first sending frequency. Alternatively, the terminal may up/down adjust a frequency level by one according to a preset frequency level. The terminal may preset different adjustment policies according to requirements. This embodiment imposes no specific limitation herein.

In a second possible implementation manner, the channel environment parameter includes only the packet sending success rate. In this case: (1). A sending frequency higher than the second sending frequency is used as the first sending frequency when the packet sending success rate is greater than a third success rate threshold and the second sending frequency is not higher than a sending frequency of any of the other terminals; or (2). A sending frequency lower than the second sending frequency is used as the first sending frequency when the packet sending success rate is less than a fourth success rate threshold and the second sending frequency is not lower than a sending frequency of any of the other terminals. The third success rate threshold is greater than or equal to the fourth success rate threshold.

Both the third success rate threshold and the fourth success rate threshold are preset empirical values. A larger packet sending success rate S indicates lower channel contention strength of the area in which the terminal is located, and the sending frequency may be properly up adjusted. On the contrary, a smaller packet sending success rate S indicates higher channel contention strength of the area in which the terminal is located, and the sending frequency may be properly down adjusted.

In addition, to ensure that sending frequencies of terminals in the surrounding area are in a relatively balanced state and avoid that some terminals have excessively high sending frequencies, but some terminals have excessively low sending frequencies, before up adjusting a sending frequency, the terminal further needs to compare a sending frequency of the terminal in a previous broadcast sending period with sending frequencies of other terminals. When the sending frequency of the terminal in the previous broadcast sending period is not higher than a sending frequency of any of the other terminals, the terminal up adjusts the sending frequency. Similarly, when the sending frequency of the terminal in the previous broadcast sending period is not lower than a sending frequency of any of the other terminals, the terminal down adjusts the sending frequency.

Optionally, the third success rate threshold may be equal to the fourth success rate threshold, that is, only one success rate threshold is set. Alternatively, the third success rate threshold may be greater than the fourth success rate threshold, that is, two success rate thresholds are set. In a possible embodiment, regardless of setting one success rate threshold or setting two success rate thresholds, in addition to the foregoing two cases (1) and (2), the terminal may use a sending frequency that is the same as the second sending frequency as the first sending frequency.

In addition, the terminal may up/down adjust the sending frequency according to a preset frequency adjustment range. Alternatively, according to a preset correspondence between a packet sending success rate and a sending frequency, the terminal may query the correspondence according to the packet sending success rate to determine the first sending frequency. Alternatively, the terminal may up/down adjust a frequency level by one according to a preset frequency level. The terminal may preset different adjustment policies according to requirements. This embodiment imposes no specific limitation herein.

In a third possible implementation manner, the channel environment parameter includes the packet time density and the packet sending success rate. In this case: (1). A sending frequency higher than the second sending frequency is used as the first sending frequency when the packet time density is less than a third density threshold, the packet sending success rate is greater than a third success rate threshold, and the second sending frequency is not higher than a sending frequency of any of the other terminals; or (2) A sending frequency lower than the second sending frequency is used as the first sending frequency when the packet time density is greater than a fourth density threshold and/or the packet sending success rate is less than a fourth success rate threshold, and the second sending frequency is not lower than a sending frequency of any of the other terminals. The third density threshold is less than or equal to the fourth density threshold, and the third success rate threshold is greater than or equal to the fourth success rate threshold.

When the packet time density ρ is less than the third density threshold and the packet sending success rate S is greater than the third success rate threshold, it indicates that both the base station load strength and the channel contention strength of the area in which the terminal is located are relatively low, and the terminal properly up adjusts the sending frequency. When the packet time density ρ is greater than the fourth density threshold and/or the packet sending success rate S is less than the fourth success rate threshold, it indicates that the base station load strength and/or the channel contention strength of the area in which the terminal is located are/is relatively high, and the terminal properly down adjusts the sending frequency.

In addition, to ensure that sending frequencies of terminals in the surrounding area are in a relatively balanced state and avoid that some terminals have excessively high sending frequencies, but some terminals have excessively low sending frequencies, before up adjusting a sending frequency, the terminal further needs to compare a sending frequency of the terminal in a previous broadcast sending period with sending frequencies of other terminals. When the sending frequency of the terminal in the previous broadcast sending period is not higher than a sending frequency of any of the other terminals, the terminal up adjusts the sending frequency. Similarly, when the sending frequency of the terminal in the previous broadcast sending period is not lower than a sending frequency of any of the other terminals, the terminal down adjusts the sending frequency.

A similarity between the third possible implementation manner and the first and the second possible implementation manners is as follows: One density threshold or two density thresholds may be set, and one success rate threshold or two success rate thresholds may be also set. In a possible embodiment, regardless of a quantity of density thresholds or a quantity of success rate thresholds, in addition to the foregoing two cases (1) and (2), the terminal may use a sending frequency that is the same as the second sending frequency as the first sending frequency.

In addition, the terminal may up/down adjust the sending frequency according to a preset frequency adjustment range. Alternatively, according to a preset correspondence among a packet time density, a packet sending success rate, and a sending frequency, the terminal may query the correspondence according to the packet time density and the packet sending success rate to determine the first sending frequency. Alternatively, the terminal may up/down adjust a frequency level by one according to a preset frequency level. The terminal may preset different adjustment policies according to requirements. This embodiment imposes no specific limitation herein.

It should be noted that, in this embodiment, only the foregoing three possible implementation manners are used as examples to describe adjustment of the sending frequency. Another possible frequency adjustment policy may be configured for the terminal. This embodiment imposes no specific limitation herein.

It should be further noted that, in the foregoing three possible implementation manners, neither a case in which the packet time density is equal to the third density threshold and/or the fourth density threshold nor a case in which the packet sending success rate is equal to the third success rate threshold and/or the fourth success rate threshold is considered, that is, a critical point case is not considered. A person skilled in the art may determine a sending frequency adjustment policy according to requirements. This can be easily figured out, based on this embodiment, by a person skilled in the art. Details are not described in this embodiment again.

After the terminal determines the first sending frequency and after the at least one broadcast receiving period ends, the terminal switches to the broadcast sending period, and sends a broadcast packet by using the determined first sending frequency.

Step 405: Randomly determine sending duration of a broadcast sending period after the at least one broadcast receiving period.

Step 406: Send a broadcast packet according to the first sending frequency and the sending duration after the at least one broadcast receiving period ends.

The foregoing step 405 and step 406 are the same as or similar to step 304 and step 305 in the embodiment shown in FIG. 3A. Details are not described in this embodiment again.

A difference between this embodiment and the embodiment shown in FIG. 3A is as follows: When the terminal generates a broadcast packet, in addition to encapsulating, in the broadcast packet, related information used to implement positioning, the terminal further needs to encapsulate the following parameters in the broadcast packet. Step 406 may include the following several sub-steps.

First, a terminal-side start sending moment and a terminal-side end sending moment that are of the broadcast sending period and that are relative to a terminal-side time is determined according to the sending duration.

It is assumed that the sending duration is $T_b$. The terminal-side end sending moment $t_{ej}'=t_{sj}'+T_b$, where $t_{sj}'$ represents the terminal-side start sending moment.

Second, a broadcast packet that includes a device identity, the terminal-side start sending moment, the terminal-side end sending moment, a terminal-side sending moment of the broadcast packet, and a frequency parameter is generated.

Third, the broadcast packet is sent.

After generating the broadcast packet that carries the foregoing parameters, the terminal sends the broadcast packet. Correspondingly, a network device in the surrounding area and another terminal in a broadcast receiving period receive the broadcast packet. The network device is configured to interact with a server according to the received broadcast packet, so as to complete positioning once. The another terminal in the broadcast receiving period is configured to determine, according to the received broadcast packet, the channel environment parameter of the area in which the another terminal is located, and then complete adaptive adjustment of the sending frequency.

Further, the timer of the terminal records, manages, and controls the duration for transmitting/receiving a broadcast packet by the radio frequency wireless module. When the duration of the broadcast sending period reaches the sending duration $T_b$, the timer sends an indication to the micro control unit of the terminal. After receiving the indication, the micro control unit controls the radio frequency wireless module to stop sending a broadcast packet, and a next broadcast receiving period starts. In the next broadcast receiving period, receiving duration is still $T_r$, and the foregoing step 401 to step 406 are repeatedly performed.

In conclusion, according to the method for controlling a broadcast packet sending frequency that is provided in this embodiment, a terminal is configured to receive a broadcast packet in a broadcast receiving period and send a broadcast packet in a broadcast sending period. A broadcast packet sent by another terminal is received in at least one broadcast receiving period; a channel environment parameter of an area in which the terminal is located is determined according to the broadcast packet sent by the another terminal, where the channel environment parameter includes packet time density and/or a packet sending success rate; and then a sending frequency for sending a broadcast packet in a broadcast sending period after the at least one broadcast receiving period by the terminal is determined according to the channel environment parameter. Therefore, the problem described in the background part that the sending frequency for sending a broadcast packet by the terminal lacks flexibility is resolved, the sending frequency is adaptively adjusted according to the channel environment parameter, and broadcast packet sending flexibility is improved.

In addition, in comparison with the embodiment shown in FIG. 3A, according to the method for controlling a broadcast packet sending frequency that is provided in this embodiment, before adjusting the sending frequency of the terminal, the terminal further compares a sending frequency of the terminal in a previous broadcast sending period with sending frequencies of other terminals. When the sending frequency of the terminal in the previous broadcast sending period is not higher than a sending frequency of any of the other terminals, the terminal up adjusts the sending frequency. Alternatively, when the sending frequency of the terminal in the previous broadcast sending period is not lower than a sending frequency of any of the other terminals, the terminal down adjusts the sending frequency. This ensures that sending frequencies of terminals in a surrounding area is in a relatively balanced state, helps balance energy efficiency of the terminals, and helps balance positioning effects of the terminals.

In addition, the embodiment shown in the foregoing FIG. 3A and the embodiment shown in the foregoing FIG. 4 provide two different technical solutions. In the embodiment shown in FIG. 3A, each broadcast packet carries a device identity, a theoretical total quantity of packet sending times, a sending sequence number corresponding to the broadcast packet, and a frequency parameter. In the embodiment shown in FIG. 4, each broadcast packet carries a device identity, a start sending moment of a current broadcast sending period, an end sending moment of the current broadcast sending period, a sending moment of the broadcast packet, and a frequency parameter. The foregoing technical solutions may be used to calculate the channel environment parameter of the surrounding environment, and then adaptively adjust the sending frequency according to the channel environment parameter.

The following are the apparatus embodiments of the present disclosure, and the apparatus embodiments and the foregoing method embodiments are corresponding to each other. For details not disclosed in the apparatus embodiments of the present disclosure, refer to the method embodiments of the present disclosure.

Figure 5:
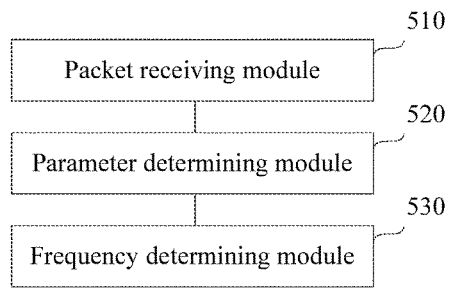
FIG. 5 is a structural block diagram of an apparatus for controlling a broadcast packet sending frequency according to an embodiment of the present disclosure.

Referring to FIG. 5, FIG. 5 shows a structural block diagram of an apparatus for controlling a broadcast packet sending frequency according to an embodiment of the present disclosure. The apparatus may be implemented, by using software, hardware, or a combination of the software and the hardware, as a part or the whole of the terminal in the implementation environment shown in FIG. 1. The terminal is configured to receive a broadcast packet in a broadcast receiving period and send a broadcast packet in a broadcast sending period. The apparatus may include a packet receiving module 510, a parameter determining module 520, and a frequency determining module 530.

The packet receiving module 510 is configured to receive, in at least one broadcast receiving period, a broadcast packet sent by another terminal.

The parameter determining module 520 is configured to determine, according to the broadcast packet sent by the another terminal, a channel environment parameter of an area in which the terminal is located, where the channel environment parameter includes packet time density and/or a packet sending success rate.

The frequency determining module 530 is configured to determine a first sending frequency according to the channel environment parameter, where the first sending frequency is a sending frequency for sending a broadcast packet in a broadcast sending period after the at least one broadcast receiving period by the terminal.

In conclusion, according to the apparatus for controlling a broadcast packet sending frequency that is provided in this embodiment, a terminal is configured to receive a broadcast packet in a broadcast receiving period and send a broadcast packet in a broadcast sending period. The terminal receives, in at least one broadcast receiving period, a broadcast packet sent by another terminal; determines, according to the broadcast packet sent by the another terminal, a channel environment parameter of an area in which the terminal is located, where the channel environment parameter includes packet time density and/or a packet sending success rate; and then determines, according to the channel environment parameter, a sending frequency for sending a broadcast packet in a broadcast sending period after the at least one broadcast receiving period by the terminal. Therefore, the problem described in the background part that the sending frequency for sending a broadcast packet by the terminal lacks flexibility is resolved, the sending frequency is adaptively adjusted according to the channel environment parameter, and broadcast packet sending flexibility is improved.

Figure 6A:
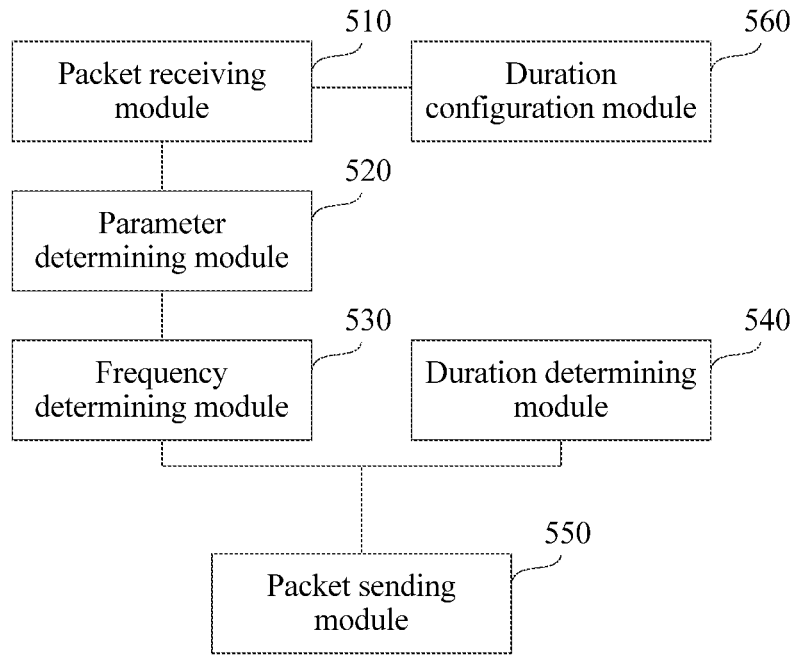
FIG. 6A is a structural block diagram of an apparatus for controlling a broadcast packet sending frequency according to another embodiment of the present disclosure.

Referring to FIG. 6A, FIG. 6A shows a structural block diagram of an apparatus for controlling a broadcast packet sending frequency according to another embodiment of the present disclosure. The apparatus may be implemented, by using software, hardware, or a combination of the software and the hardware, as a part or the whole of the terminal in the implementation environment shown in FIG. 1. The terminal is configured to: receive a broadcast packet in a broadcast receiving period and send a broadcast packet in a broadcast sending period. The apparatus may include a packet receiving module 510, a parameter determining module 520, and a frequency determining module 530.

The packet receiving module 510 is configured to receive, in at least one broadcast receiving period, a broadcast packet sent by another terminal.

The parameter determining module 520 is configured to determine, according to the broadcast packet sent by the another terminal, a channel environment parameter of an area in which the terminal is located, where the channel environment parameter includes packet time density and/or a packet sending success rate.

Figure 6B:
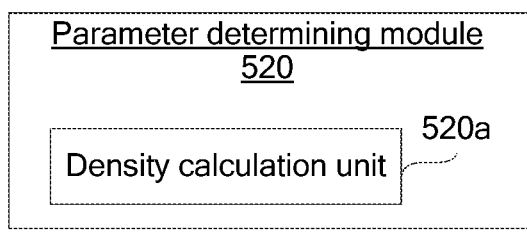
FIG. 6B is a structural block diagram of a parameter determining module used in an embodiment of the present disclosure.

Referring to FIG. 6B, in this case, the channel environment parameter includes the packet time density, and the parameter determining module 520 includes a density calculation unit 520a.

The density calculation unit 520a is configured to calculate the packet time density ρ according to the following formula:

$$\rho = \frac{N_r}{T_r}$$

where $N_r$ represents a quantity of packet receiving times of the terminal in the at least one broadcast receiving period, and $T_r$ represents a receiving duration sum of the at least one broadcast receiving period.

Figure 6C:
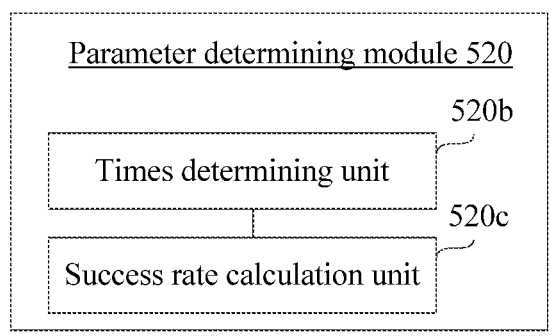
FIG. 6C is a structural block diagram of another parameter determining module used in an embodiment of the present disclosure.

Referring to FIG. 6C, in this case, the channel environment parameter includes the packet sending success rate, and the parameter determining module 520 includes a times determining unit 520b and a success rate calculation unit 520c.

The times determining unit 520b is configured to determine, according to a broadcast packet sent by each of other terminals, a theoretical quantity of packet sending times of each of the other terminals in the at least one broadcast receiving period.

The success rate calculation unit 520c is configured to calculate the packet sending success rate S according to the following formula:

$$S = \frac{N_r}{N_t} = \frac{N_r}{\sum_{j=1}^{P} N_{t(j)}}$$

where $N_r$ represents a quantity of packet receiving times of the terminal in the at least one broadcast receiving period; P indicates that the terminal receives broadcast packets from p other terminals in the at least one broadcast receiving period, P≥1, and P is an integer; j ∈ [1, P] and j is an integer; and $N_t$ represents a sum of theoretical quantities of packet sending times of the P other terminals in the at least one broadcast receiving period.

It should be noted that in different implementation manners, the parameter determining module 520 may include only the density calculation unit 520a; or may include only the times determining unit 520b and the success rate calculation unit 520c; or may include the density calculation unit 520a, the times determining unit 520b, and the success rate calculation unit 520c. Types and a quantity of function modules included in the parameter determining module 520 are determined according to types and a quantity of parameters included in the channel environment parameter.

The frequency determining module 530 is configured to determine a first sending frequency according to the channel environment parameter, where the first sending frequency is a sending frequency for sending a broadcast packet in a broadcast sending period after the at least one broadcast receiving period by the terminal.

The frequency determining module 530 includes different function modules according to different types and quantities of parameters included in the channel environment parameter. Details are as follows.

Figure 6D:
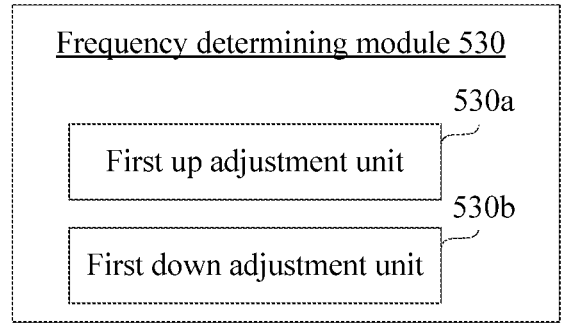
FIG. 6D is a structural block diagram of a frequency determining module used in an embodiment of the present disclosure.

1. Referring to FIG. 6D, in this case, the channel environment parameter includes only the packet time density, and the frequency determining module 530 includes a first up adjustment unit 530a and a first down adjustment unit 530b.

The first up adjustment unit 530a is configured to use a sending frequency higher than a second sending frequency as the first sending frequency when the packet time density is less than a first density threshold.

The first down adjustment unit 530b is configured to use a sending frequency lower than a second sending frequency as the first sending frequency when the packet time density is greater than a second density threshold.

The second sending frequency is a sending frequency for sending a broadcast packet in a broadcast sending period before the at least one broadcast receiving period by the terminal, and the first density threshold is less than or equal to the second density threshold.

Figure 6E:
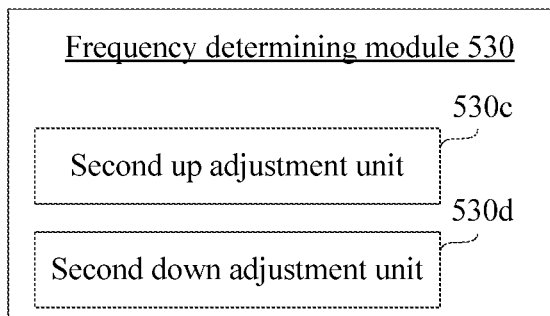
FIG. 6E is a structural block diagram of another frequency determining module used in an embodiment of the present disclosure.

2. Referring to FIG. 6E, in this case, the channel environment parameter includes only the packet sending success rate, and the frequency determining module 530 includes a second up adjustment unit 530c and a second down adjustment unit 530d.

The second up adjustment unit 530c is configured to use a sending frequency higher than a second sending frequency as the first sending frequency when the packet sending success rate is greater than a first success rate threshold.

The second down adjustment unit 530d is configured to use a sending frequency lower than a second sending frequency as the first sending frequency when the packet sending success rate is less than a second success rate threshold.

The second sending frequency is a sending frequency for sending a broadcast packet in a broadcast sending period before the at least one broadcast receiving period by the terminal, and the first success rate threshold is greater than or equal to the second success rate threshold.

Figure 6F:
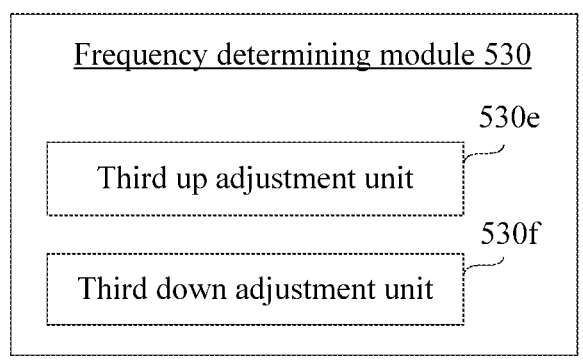
FIG. 6F is a structural block diagram of still another frequency determining module used in an embodiment of the present disclosure.

3. Referring to FIG. 6F, in this case, the channel environment parameter includes the packet time density and the packet sending success rate, and the frequency determining module 530 includes a third up adjustment unit 530e and a third down adjustment unit 530f.

The third up adjustment unit 530e is configured to use a sending frequency higher than a second sending frequency as the first sending frequency when the packet time density is less than a first density threshold and the packet sending success rate is greater than a first success rate threshold.

The third down adjustment unit 530f is configured to use a sending frequency lower than a second sending frequency as the first sending frequency when the packet time density is greater than a second density threshold and/or the packet sending success rate is less than a second success rate threshold.

The second sending frequency is a sending frequency for sending a broadcast packet in a broadcast sending period before the at least one broadcast receiving period by the terminal, the first density threshold is less than or equal to the second density threshold, and the first success rate threshold is greater than or equal to the second success rate threshold.

Optionally, the apparatus provided in this embodiment, as shown in FIG. 6A, further includes a duration determining module 540 and a packet sending module 550.

The duration determining module 540 is configured to randomly determine sending duration of the broadcast sending period after the at least one broadcast receiving period.

The packet sending module 550 is configured to send a broadcast packet according to the first sending frequency and the sending duration after the at least one broadcast receiving period ends.

Optionally, the apparatus provided in this embodiment further includes a duration configuration module 560.

The duration configuration module 560 is configured to configure receiving duration of each broadcast receiving period to be greater than a reciprocal of a preset minimum sending frequency, and configure receiving duration of a broadcast receiving period of the terminal to be equal to receiving duration of a broadcast receiving period of the another terminal.

It should be noted that in some different implementation manners, the function modules shown in FIG. 6A may be separately implemented as the apparatus for controlling a broadcast packet sending frequency that is provided in this embodiment of the present disclosure. Alternatively, the function modules shown in FIG. 6A, FIG. 6B, and FIG. 6D may be combined and implemented as the apparatus for controlling a broadcast packet sending frequency that is provided in this embodiment of the present disclosure. Alternatively, the function modules shown in FIG. 6A, FIG. 6C, and FIG. 6E may be combined and implemented as the apparatus for controlling a broadcast packet sending frequency that is provided in this embodiment of the present disclosure. Alternatively, the function modules shown in FIG. 6A, FIG. 6B, FIG. 6C, and FIG. 6F may be combined and implemented as the apparatus for controlling a broadcast packet sending frequency that is provided in this embodiment of the present disclosure. Different function module combinations may be selected according to requirements. This embodiment imposes no specific limitation herein.

In conclusion, according to the apparatus for controlling a broadcast packet sending frequency that is provided in this embodiment, a terminal is configured to receive a broadcast packet in a broadcast receiving period and send a broadcast packet in a broadcast sending period. The terminal receives, in at least one broadcast receiving period, a broadcast packet sent by another terminal; determines, according to the broadcast packet sent by the another terminal, a channel environment parameter of an area in which the terminal is located, where the channel environment parameter includes packet time density and/or a packet sending success rate; and then determines, according to the channel environment parameter, a sending frequency for sending a broadcast packet in a broadcast sending period after the at least one broadcast receiving period by the terminal. Therefore, the problem described in the background part that the sending frequency for sending a broadcast packet by the terminal lacks flexibility is resolved, the sending frequency is adaptively adjusted according to the channel environment parameter, and broadcast packet sending flexibility is improved.

In addition, according to the apparatus for controlling a broadcast packet sending frequency that is provided in this embodiment, the channel environment parameter is further represented by using the packet time density and/or the packet sending success rate. The packet time density and the packet sending success rate correlate with each other, but are different from each other to some extent. Both the packet time density and the packet sending success rate reflect, to some extent, a quantity of broadcast packets sent per unit time by other terminals in the area in which the terminal is located. The packet time density is mainly used to measure base station load strength. The packet sending success rate is mainly used to measure channel contention strength. The terminal adaptively adjusts the sending frequency in the subsequent broadcast sending period by using one or both of the foregoing two parameters measured in the broadcast receiving period, so as to balance energy consumption of network devices and prolong network lifetime while effectively controlling the base station load strength and the channel contention strength of the surrounding environment and ensuring positioning reliability and a positioning success rate.

Figure 7A:
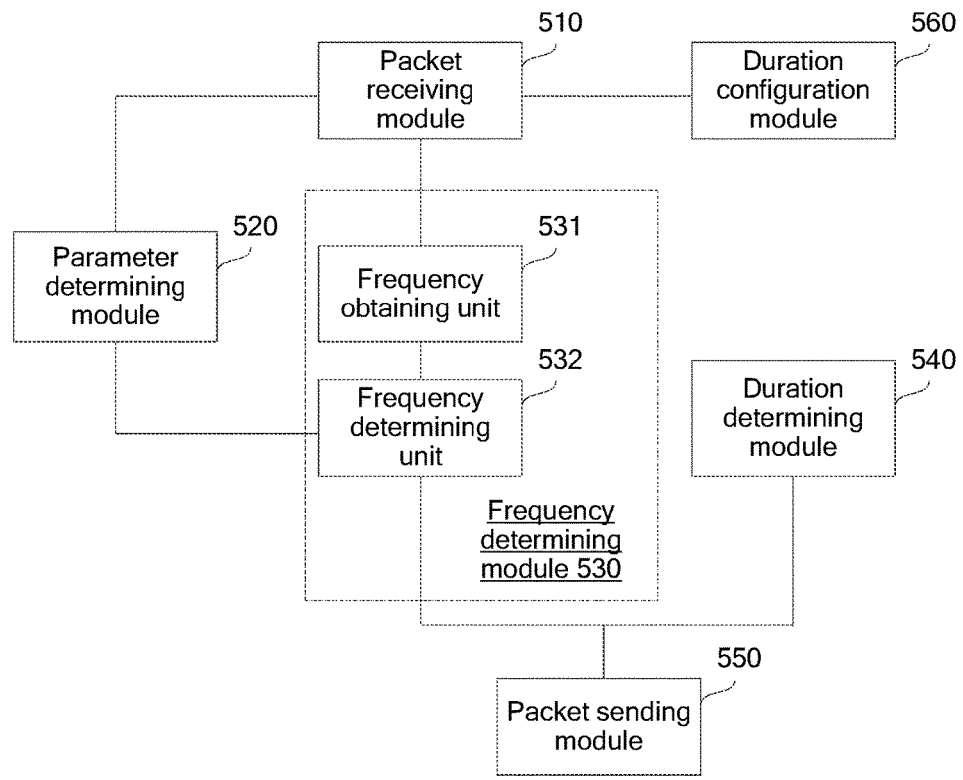
FIG. 7A is a structural block diagram of an apparatus for controlling a broadcast packet sending frequency according to still another embodiment of the present disclosure.

Referring to FIG. 7A, FIG. 7A shows a structural block diagram of an apparatus for controlling a broadcast packet sending frequency according to still another embodiment of the present disclosure. The apparatus may be implemented, by using software, hardware, or a combination of the software and the hardware, as a part or the whole of the terminal in the implementation environment shown in FIG. 1. The terminal is configured to receive a broadcast packet in a broadcast receiving period and send a broadcast packet in a broadcast sending period. The apparatus may include a packet receiving module 510, a parameter determining module 520, and a frequency determining module 530.

The packet receiving module 510 is configured to receive, in at least one broadcast receiving period, a broadcast packet sent by another terminal.

The parameter determining module 520 is configured to determine, according to the broadcast packet sent by the another terminal, a channel environment parameter of an area in which the terminal is located, where the channel environment parameter includes packet time density and/or a packet sending success rate.

The frequency determining module 530 is configured to determine a first sending frequency according to the channel environment parameter, where the first sending frequency is a sending frequency for sending a broadcast packet in a broadcast sending period after the at least one broadcast receiving period by the terminal.

The function modules included in the parameter determining module 520 have been described in detail in the embodiment shown in FIG. 6A. Details are not described in this embodiment again.

A difference between this embodiment and the embodiment shown in FIG. 6A is as follows. In this embodiment, the frequency determining module 530 includes a frequency obtaining unit 531 and a frequency determining unit 532.

The frequency obtaining unit 531 is configured to determine, according to a frequency parameter carried in a broadcast packet sent by each of other terminals, a sending frequency for sending a broadcast packet by each of the other terminals.

The frequency determining unit 532 is configured to determine the first sending frequency according to the channel environment parameter, a second sending frequency, and the sending frequency of each of the other terminals.

The second sending frequency is a sending frequency for sending a broadcast packet in a broadcast sending period before the at least one broadcast receiving period by the terminal.

The frequency determining unit 532 includes different function modules according to different types and quantities of parameters included in the channel environment parameter. Details are as follows.

Figure 7B:
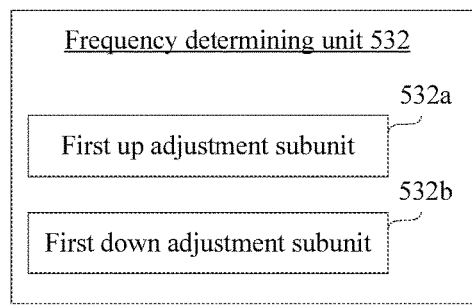
FIG. 7B is a structural block diagram of a frequency determining unit used in an embodiment of the present disclosure.

1. Referring to FIG. 7B, in this case, the channel environment parameter includes only the packet time density, and the frequency determining unit 532 includes a first up adjustment subunit 532a and a first down adjustment subunit 532b.

The first up adjustment subunit 532a is configured to use a sending frequency higher than the second sending frequency as the first sending frequency when the packet time density is less than a third density threshold and the second sending frequency is not higher than a sending frequency of any of the other terminals.

The first down adjustment subunit 532b is configured to use a sending frequency lower than the second sending frequency as the first sending frequency when the packet time density is greater than a fourth density threshold and the second sending frequency is not lower than a sending frequency of any of the other terminals.

The third density threshold is less than or equal to the fourth density threshold.

Figure 7C:
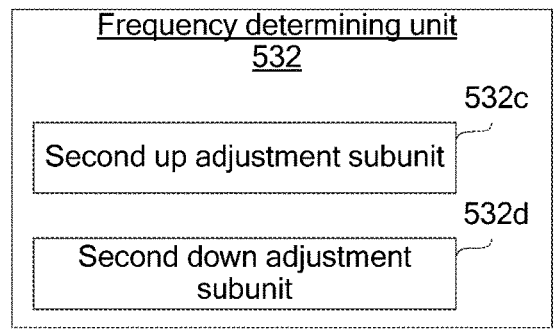
FIG. 7C is a structural block diagram of another frequency determining unit used in an embodiment of the present disclosure.

2. Referring to FIG. 7C, in this case, the channel environment parameter includes only the packet sending success rate, and the frequency determining unit 532 includes a second up adjustment subunit 532c and a second down adjustment subunit 532d.

The second up adjustment subunit 532c is configured to use a sending frequency higher than the second sending frequency as the first sending frequency when the packet sending success rate is greater than a third success rate threshold and the second sending frequency is not higher than a sending frequency of any of the other terminals.

The second down adjustment subunit 532d is configured to use a sending frequency lower than the second sending frequency as the first sending frequency when the packet sending success rate is less than a fourth success rate threshold and the second sending frequency is not lower than a sending frequency of any of the other terminals.

The third success rate threshold is greater than or equal to the fourth success rate threshold.

Figure 7D:
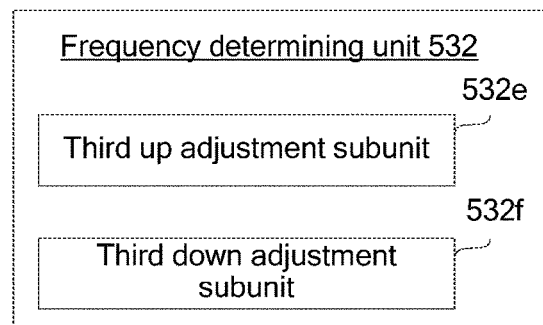
FIG. 7D is a structural block diagram of still another frequency determining unit used in an embodiment of the present disclosure.

3. Referring to FIG. 7D, in this case, the channel environment parameter includes the packet time density and the packet sending success rate, and the frequency determining unit 532 includes a third up adjustment subunit 532e and a third down adjustment subunit 532f.

The third up adjustment subunit 532e is configured to use a sending frequency higher than the second sending frequency as the first sending frequency when the packet time density is less than a third density threshold, the packet sending success rate is greater than a third success rate threshold, and the second sending frequency is not higher than a sending frequency of any of the other terminals.

The third down adjustment subunit 532f is configured to use a sending frequency lower than the second sending frequency as the first sending frequency when the packet time density is greater than a fourth density threshold and/or the packet sending success rate is less than a fourth success rate threshold, and the second sending frequency is not lower than a sending frequency of any of the other terminals.

The third density threshold is less than or equal to the fourth density threshold, and the third success rate threshold is greater than or equal to the fourth success rate threshold.

Optionally, the apparatus provided in this embodiment, as shown in FIG. 7A, further includes a duration determining module 540 and a packet sending module 550.

The duration determining module 540 is configured to randomly determine sending duration of the broadcast sending period after the at least one broadcast receiving period.

The packet sending module 550 is configured to send a broadcast packet according to the first sending frequency and the sending duration after the at least one broadcast receiving period ends.

Optionally, the apparatus provided in this embodiment further includes a duration configuration module 560.

The duration configuration module 560 is configured to configure receiving duration of each broadcast receiving period to be greater than a reciprocal of a preset minimum sending frequency, and configure receiving duration of a broadcast receiving period of the terminal to be equal to receiving duration of a broadcast receiving period of the another terminal.

It should be noted that in some different implementation manners, the function modules shown in FIG. 7A may be separately implemented as the apparatus for controlling a broadcast packet sending frequency that is provided in this embodiment of the present disclosure. Alternatively, the function modules shown in FIG. 7A, FIG. 6B, and FIG. 7B may be combined and implemented as the apparatus for controlling a broadcast packet sending frequency that is provided in this embodiment of the present disclosure. Alternatively, the function modules shown in FIG. 7A, FIG. 6C, and FIG. 7C may be combined and implemented as the apparatus for controlling a broadcast packet sending frequency that is provided in this embodiment of the present disclosure. Alternatively, the function modules shown in FIG. 7A, FIG. 6B, FIG. 6C, and FIG. 7D may be combined and implemented as the apparatus for controlling a broadcast packet sending frequency that is provided in this embodiment of the present disclosure. Different function module combinations may be selected according to requirements. This embodiment imposes no specific limitation herein.

In conclusion, according to the apparatus for controlling a broadcast packet sending frequency that is provided in this embodiment, a terminal is configured to receive a broadcast packet in a broadcast receiving period and send a broadcast packet in a broadcast sending period. The terminal receives, in at least one broadcast receiving period, a broadcast packet sent by another terminal; determines, according to the broadcast packet sent by the another terminal, a channel environment parameter of an area in which the terminal is located, where the channel environment parameter includes packet time density and/or a packet sending success rate; and then determines, according to the channel environment parameter, a sending frequency for sending a broadcast packet in a broadcast sending period after the at least one broadcast receiving period by the terminal. Therefore, the problem described in the background part that the sending frequency for sending a broadcast packet by the terminal lacks flexibility is resolved, the sending frequency is adaptively adjusted according to the channel environment parameter, and broadcast packet sending flexibility is improved.

In addition, in comparison with the embodiment shown in FIG. 6A, according to the apparatus for controlling a broadcast packet sending frequency that is provided in this embodiment, before adjusting the sending frequency of the terminal, the terminal further compares a sending frequency of the terminal in a previous broadcast sending period with sending frequencies of other terminals. When the sending frequency of the terminal in the previous broadcast sending period is not higher than a sending frequency of any of the other terminals, the terminal up adjusts the sending frequency. Alternatively, when the sending frequency of the terminal in the previous broadcast sending period is not lower than a sending frequency of any of the other terminals, the terminal down adjusts the sending frequency. This ensures that sending frequencies of terminals in a surrounding area is in a relatively balanced state, helps balance energy efficiency of the terminals, and helps balance positioning effects of the terminals.

It should be noted that when the apparatus for controlling a broadcast packet sending frequency that is provided in the foregoing embodiment sends or receives a broadcast packet, division of the foregoing function modules is used as an example for description. The foregoing functions may be allocated, according to a requirement, to different function modules for implementation, that is, an internal structure of the device is divided into different function modules to implement all or some of the functions described above. In addition, the apparatus for controlling a broadcast packet sending frequency that is provided in the foregoing embodiment and the method embodiment of the method for controlling a broadcast packet sending frequency that is provided in the following embodiment pertain to a same concept. For a specific implementation process, refer to the method embodiments. Details are not described herein again.

Figure 8:
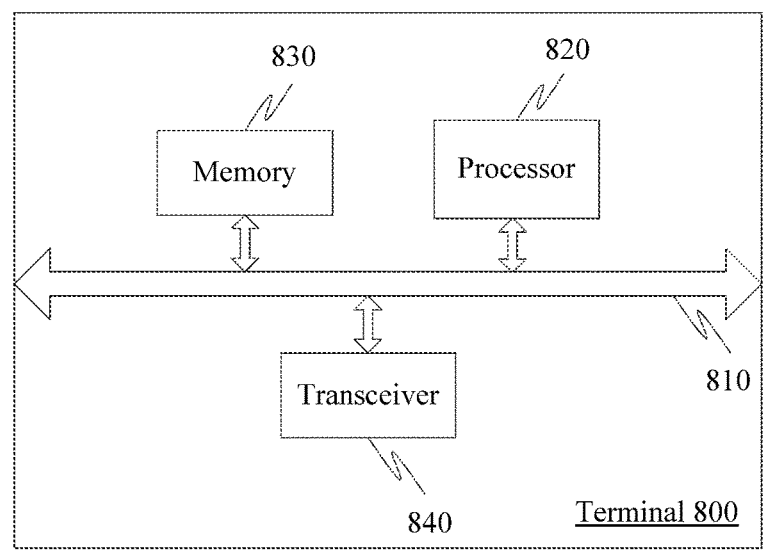
FIG. 8 is a structural block diagram of a terminal according to an embodiment of the present disclosure.

Referring to FIG. 8, FIG. 8 shows a structural block diagram of a terminal according to an embodiment of the present disclosure. The terminal 800 is configured to receive a broadcast packet in a broadcast receiving period and send a broadcast packet in a broadcast sending period. The terminal 800 includes a bus 810, and a processor 820, a memory 830, and a transceiver 840 that communicate with each other using the bus 810. The memory 830 is configured to store one or more instructions, and the one or more instructions are configured to be executed by the processor 820.

The transceiver 840 is configured to receive, in at least one broadcast receiving period, a broadcast packet sent by another terminal.

The processor 820 is configured to determine, according to the broadcast packet sent by the another terminal, a channel environment parameter of an area in which the terminal is located, where the channel environment parameter includes packet time density and/or a packet sending success rate.

The processor 820 is further configured to determine a first sending frequency according to the channel environment parameter, where the first sending frequency is a sending frequency for sending a broadcast packet in a broadcast sending period after the at least one broadcast receiving period by the terminal.

In conclusion, according to the terminal provided in this embodiment, the terminal is configured to receive a broadcast packet in a broadcast receiving period and send a broadcast packet in a broadcast sending period. The terminal receives, in at least one broadcast receiving period, a broadcast packet sent by another terminal; determines, according to the broadcast packet sent by the another terminal, a channel environment parameter of an area in which the terminal is located, where the channel environment parameter includes packet time density and/or a packet sending success rate; and then determines, according to the channel environment parameter, a sending frequency for sending a broadcast packet in a broadcast sending period after the at least one broadcast receiving period by the terminal. Therefore, the problem described in the background part that the sending frequency for sending a broadcast packet by the terminal lacks flexibility is resolved, the sending frequency is adaptively adjusted according to the channel environment parameter, and broadcast packet sending flexibility is improved.

In an optional embodiment provided based on the embodiment shown in FIG. 8, the channel environment parameter includes only the packet time density.

The determining a first sending frequency according to the channel environment parameter includes using a sending frequency higher than a second sending frequency as the first sending frequency when the packet time density is less than a first density threshold; or using a sending frequency lower than a second sending frequency as the first sending frequency when the packet time density is greater than a second density threshold.

The second sending frequency is a sending frequency for sending a broadcast packet in a broadcast sending period before the at least one broadcast receiving period by the terminal, and the first density threshold is less than or equal to the second density threshold.

In an optional embodiment provided based on the embodiment shown in FIG. 8, the channel environment parameter includes only the packet sending success rate.

The determining a first sending frequency according to the channel environment parameter includes using a sending frequency higher than a second sending frequency as the first sending frequency when the packet sending success rate is greater than a first success rate threshold; or using a sending frequency lower than a second sending frequency as the first sending frequency when the packet sending success rate is less than a second success rate threshold.

The second sending frequency is a sending frequency for sending a broadcast packet in a broadcast sending period before the at least one broadcast receiving period by the terminal, and the first success rate threshold is greater than or equal to the second success rate threshold.

In an optional embodiment provided based on the embodiment shown in FIG. 8, the channel environment parameter includes the packet time density and the packet sending success rate.

The determining a first sending frequency according to the channel environment parameter includes using a sending frequency higher than a second sending frequency as the first sending frequency when the packet time density is less than a first density threshold and the packet sending success rate is greater than a first success rate threshold; or using a sending frequency lower than a second sending frequency as the first sending frequency when the packet time density is greater than a second density threshold and/or the packet sending success rate is less than a second success rate threshold.

The second sending frequency is a sending frequency for sending a broadcast packet in a broadcast sending period before the at least one broadcast receiving period by the terminal, the first density threshold is less than or equal to the second density threshold, and the first success rate threshold is greater than or equal to the second success rate threshold.

In an optional embodiment provided based on the embodiment shown in FIG. 8, the determining a first sending frequency according to the channel environment parameter includes determining, according to a frequency parameter carried in a broadcast packet sent by each of other terminals, a sending frequency for sending a broadcast packet by each of the other terminals; and determining the first sending frequency according to the channel environment parameter, a second sending frequency, and the sending frequency of each of the other terminals.

The second sending frequency is a sending frequency for sending a broadcast packet in a broadcast sending period before the at least one broadcast receiving period by the terminal.

In an optional embodiment provided based on the embodiment shown in FIG. 8, the channel environment parameter includes only the packet time density.

The determining the first sending frequency according to the channel environment parameter, a second sending frequency, and the sending frequency of each of the other terminals includes using a sending frequency higher than the second sending frequency as the first sending frequency when the packet time density is less than a third density threshold and the second sending frequency is not higher than a sending frequency of any of the other terminals; or using a sending frequency lower than the second sending frequency as the first sending frequency when the packet time density is greater than a fourth density threshold and the second sending frequency is not lower than a sending frequency of any of the other terminals.

The third density threshold is less than or equal to the fourth density threshold.

In an optional embodiment provided based on the embodiment shown in FIG. 8, the channel environment parameter includes only the packet sending success rate.

The determining the first sending frequency according to the channel environment parameter, a second sending frequency, and the sending frequency of each of the other terminals includes using a sending frequency higher than the second sending frequency as the first sending frequency when the packet sending success rate is greater than a third success rate threshold and the second sending frequency is not higher than a sending frequency of any of the other terminals; or using a sending frequency lower than the second sending frequency as the first sending frequency when the packet sending success rate is less than a fourth success rate threshold and the second sending frequency is not lower than a sending frequency of any of the other terminals.

The third success rate threshold is greater than or equal to the fourth success rate threshold.

In an optional embodiment provided based on the embodiment shown in FIG. 8, the channel environment parameter includes the packet time density and the packet sending success rate.

The determining the first sending frequency according to the channel environment parameter, a second sending frequency, and the sending frequency of each of the other terminals includes using a sending frequency higher than the second sending frequency as the first sending frequency when the packet time density is less than a third density threshold, the packet sending success rate is greater than a third success rate threshold, and the second sending frequency is not higher than a sending frequency of any of the other terminals; or using a sending frequency lower than the second sending frequency as the first sending frequency when the packet time density is greater than a fourth density threshold and/or the packet sending success rate is less than a fourth success rate threshold, and the second sending frequency is not lower than a sending frequency of any of the other terminals.

The third density threshold is less than or equal to the fourth density threshold, and the third success rate threshold is greater than or equal to the fourth success rate threshold.

In an optional embodiment provided based on the embodiment shown in FIG. 8, the channel environment parameter includes the packet time density.

The determining, according to the broadcast packet sent by the another terminal, a channel environment parameter of an area in which the terminal is located includes calculating the packet time density ρ according to the following formula:

$$\rho = \frac{N_r}{T_r}$$

where $N_r$ represents a quantity of packet receiving times of the terminal in the at least one broadcast receiving period, and $T_r$ represents a receiving duration sum of the at least one broadcast receiving period.

In an optional embodiment provided based on the embodiment shown in FIG. 8, the channel environment parameter includes the packet sending success rate.

The determining, according to the broadcast packet sent by the another terminal, a channel environment parameter of an area in which the terminal is located includes determining, according to the broadcast packet sent by each of the other terminals, a theoretical quantity of packet sending times of each of the other terminals in the at least one broadcast receiving period; and calculating the packet sending success rate S according to the following formula:

$$S = \frac{N_r}{N_t} = \frac{N_r}{\sum_{j=1}^{P} N_{t(j)}}$$

where $N_r$ represents a quantity of packet receiving times of the terminal in the at least one broadcast receiving period; P indicates that the terminal receives broadcast packets from p other terminals in the at least one broadcast receiving period, P≥1, and P is an integer; j ∈ [1, P] and j is an integer; and $N_t$ represents a sum of theoretical quantities of packet sending times of the P other terminals in the at least one broadcast receiving period.

In an optional embodiment provided based on the embodiment shown in FIG. 8, the processor 820 is further configured to randomly determine sending duration of the broadcast sending period after the at least one broadcast receiving period.

The transceiver 840 is further configured to send a broadcast packet according to the first sending frequency and the sending duration after the at least one broadcast receiving period ends.

In an optional embodiment provided based on the embodiment shown in FIG. 8, the processor 820 is further configured to configure receiving duration of each broadcast receiving period to be greater than a reciprocal of a preset minimum sending frequency, and configure receiving duration of a broadcast receiving period of the terminal to be equal to receiving duration of a broadcast receiving period of the another terminal.

Optionally, according to the terminal provided in this embodiment, a channel environment parameter is further represented by using packet time density and/or a packet sending success rate. The packet time density and the packet sending success rate correlate with each other, but are different from each other to some extent. Both the packet time density and the packet sending success rate reflect, to some extent, a quantity of broadcast packets sent per unit time by other terminals in the area in which the terminal is located. The packet time density is mainly used to measure base station load strength. The packet sending success rate is mainly used to measure channel contention strength. The terminal adaptively adjusts the sending frequency in the subsequent broadcast sending period by using one or both of the foregoing two parameters measured in the broadcast receiving period, so as to balance energy consumption of network devices and prolong network lifetime while effectively controlling the base station load strength and the channel contention strength of the surrounding environment and ensuring positioning reliability and a positioning success rate.

Optionally, according to the terminal provided in this embodiment, before adjusting the sending frequency of the terminal, the terminal further compares a sending frequency of the terminal in a previous broadcast sending period with sending frequencies of the other terminals. When the sending frequency of the terminal in the previous broadcast sending period is not higher than a sending frequency of any of the other terminals, the terminal up adjusts the sending frequency. Alternatively, when the sending frequency of the terminal in the previous broadcast sending period is not lower than a sending frequency of any of the other terminals, the terminal down adjusts the sending frequency. This ensures that sending frequencies of terminals in a surrounding area is in a relatively balanced state, helps balance energy efficiency of the terminals, and helps balance positioning effects of the terminals.

It should be understood that, unless otherwise specified clearly in the context, the singular form "one" ("a", "an", or "the") used in this specification is intended to further include a plural form. It should be further understood that "and/or" used in this specification indicates and includes any or all possible combinations of one or more associated listed items.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by using hardware or a program instructing related hardware. The program may be stored in a computer-readable storage medium. The storage medium may be a read-only memory, a magnetic disk, an optical disc, or the like.

The foregoing descriptions are merely examples of embodiments of the present disclosure, but are not intended to limit the present disclosure. Any modification, equivalent replacement, improvement, and the like made without departing from the spirit and principle of the present disclosure shall fall within the protection scope of the present disclosure.

What is claimed is:

1. A method for controlling a broadcast packet sending frequency of a first terminal, the method comprising:
    receiving, by the first terminal, in at least one broadcast receiving period, a first broadcast packet sent by a second terminal;
    determining, by the first terminal according to the first broadcast packet, a channel environment parameter of an area in which the first terminal is located, wherein the channel environment parameter comprises at least one of packet time density or a packet sending success rate; and
    determining by the first terminal, a first sending frequency according to the channel environment parameter, wherein the first sending frequency is for sending a second broadcast packet in a broadcast sending period after the at least one broadcast receiving period.

2. The method of claim 1, wherein the channel environment parameter comprises only the packet time density, wherein determining the first sending frequency comprises:
    using, as the first sending frequency, a sending frequency higher than a second sending frequency when the packet time density is less than a first density threshold; and
    using, as the first sending frequency, a sending frequency lower than the second sending frequency when the packet time density is greater than a second density threshold, wherein the second sending frequency is for sending a third broadcast packet in a broadcast sending period before the at least one broadcast receiving period, and wherein the first density threshold is less than the second density threshold.

3. The method of claim 1, wherein the channel environment parameter comprises only the packet sending success rate, wherein determining the first sending frequency comprises:
    using, as the first sending frequency, a sending frequency higher than a second sending frequency when the packet sending success rate is greater than a first success rate threshold; and
    using, as the first sending frequency, a sending frequency lower than the second sending frequency when the packet sending success rate is less than a second success rate threshold, wherein the second sending frequency is for sending a third broadcast packet in a broadcast sending period before the at least one broadcast receiving period, and wherein the first success rate threshold is greater than the second success rate threshold.

4. The method of claim 1, wherein the channel environment parameter comprises the packet time density and the packet sending success rate; and determining the first sending frequency comprises:
    using, as the first sending frequency, a sending frequency higher than a second sending frequency when the packet time density is less than a first density threshold and the packet sending success rate is greater than a first success rate threshold; and
    using, as the first sending frequency, a sending frequency lower than the second sending frequency when the packet time density is greater than a second density threshold and/or the packet sending success rate is less than a second success rate threshold, wherein the second sending frequency is for sending a third broadcast packet in a broadcast sending period before the at least one broadcast receiving period, and wherein the first density threshold is less than the second density threshold, and the first success rate threshold is greater than the second success rate threshold.

5. The method of claim 1, wherein determining the first sending frequency comprises:
    determining, according to a frequency parameter carried in broadcast packets sent by each of a plurality of other terminals, a third sending frequency for sending a third broadcast packet by each of the plurality of other terminals; and
    determining the first sending frequency according to the channel environment parameter, a second sending frequency, and the third sending frequency, and wherein the second sending frequency is for sending a fourth broadcast packet in a broadcast sending period before the at least one broadcast receiving period by the first terminal.

6. The method of claim 5, wherein the channel environment parameter comprises only the packet time density; and determining the first sending frequency, the second sending frequency, and the third sending frequency comprises:

using, as the first sending frequency, a sending frequency higher than the second sending frequency when the packet time density is less than a third density threshold and the second sending frequency is not higher than the third sending frequency; and using, as the first sending frequency, a sending frequency lower than the second sending frequency when the packet time density is greater than a fourth density threshold and the second sending frequency is not lower than the third sending frequency, and wherein the third density threshold is less than the fourth density threshold.

7. The method of claim 5, wherein the channel environment parameter comprises only the packet sending success rate, wherein determining the first sending frequency, the second sending frequency, and the third sending frequency comprises:

using, as the first sending frequency, a sending frequency higher than the second sending frequency when the packet sending success rate is greater than a third success rate threshold and the second sending frequency is not higher than the third sending frequency; and using, as the first sending frequency, a sending frequency lower than the second sending frequency when the packet sending success rate is less than a fourth success rate threshold and the second sending frequency is not lower than the third sending frequency, and wherein the third success rate threshold is greater than the fourth success rate threshold.

8. The method of claim 5, wherein the channel environment parameter comprises the packet time density and the packet sending success rate, wherein determining the first sending frequency, the second sending frequency, and the third sending frequency comprises:

using, as the first sending frequency, a sending frequency higher than the second sending frequency when the packet time density is less than a third density threshold, the packet sending success rate is greater than a third success rate threshold, and the second sending frequency is not higher than the third sending frequency; and using, as the first sending frequency, a sending frequency lower than the second sending frequency when the packet time density is greater than a fourth density threshold and/or the packet sending success rate is less than a fourth success rate threshold, and the second sending frequency is not lower than the third sending frequency, wherein the third density threshold is less than the fourth density threshold, and wherein the third success rate threshold is greater than the fourth success rate threshold.

9. The method of claim 1, wherein the channel environment parameter comprises the packet time density, wherein determining the channel environment parameter of an area in which the first terminal is located comprises:

calculating the packet time density ρ according to the following formula:

$$\rho = \frac{N_r}{T_r},$$

wherein $N_r$ represents a quantity of packet receiving times of the first terminal in the at least one broadcast receiving period, and wherein $T_r$ represents a receiving duration sum of the at least one broadcast receiving period.

10. The method of claim 1, wherein the channel environment parameter comprises the packet sending success rate; and determining the channel environment parameter comprises:

determining, according to the broadcast packet sent by each of the second terminal, a theoretical quantity of packet sending times of the second terminal in the at least one broadcast receiving period; and calculating the packet sending success rate S according to the following formula:

$$S = \frac{N_r}{N_t} = \frac{N_r}{\sum_{j=1}^{P} N_{t(j)}},$$

wherein $N_r$ represents a quantity of packet receiving times of the first terminal in the at least one broadcast receiving period, P represents a quantity of other terminals from which the first terminal receives broadcast packets in the at least one broadcast receiving period, $P \geq 1$, and P is an integer; j $\in [1, P]$ and j is an integer, and wherein $N_t$ represents a sum of theoretical quantities of packet sending times of P other terminals in the at least one broadcast receiving period.

11. The method of claim 1, further comprising:

randomly determining, by the first terminal, a sending duration of the broadcast sending period after the at least one broadcast receiving period; and sending, by the first terminal, the second broadcast packet according to the first sending frequency and the sending duration after the at least one broadcast receiving period ends.

12. The method of claim 1, further comprising configuring, by the first terminal, a receiving duration of a broadcast receiving period of the first terminal to be equal to receiving duration of a broadcast receiving period of the second terminal, wherein the receiving duration is greater than a reciprocal of a preset minimum sending frequency.

13. A first terminal comprising:

a transceiver configured to receive, in at least one broadcast receiving period, a first broadcast packet sent by a second terminal;

a processor coupled to the transceiver, the processor configured to:

determine, according to the first broadcast packet, a channel environment parameter of an area in which the first terminal is located, wherein the channel environment parameter comprises packet time density and/or a packet sending success rate; and determine a first sending frequency according to the channel environment parameter, wherein the first sending frequency is for sending a second broadcast packet in a broadcast sending period after the at least one broadcast receiving period.

14. The first terminal of claim 13, wherein the channel environment parameter comprises only the packet time density, wherien the processor being configured to determine the first sending frequency comprises the processor being configured to:

use, as the first sending frequency, a sending frequency higher than a second sending frequency when the packet time density is less than a first density threshold; and use, as the first sending frequency, a sending frequency lower than a second sending frequency when the packet time density is greater than a second density threshold, wherein the second sending frequency is for sending a third broadcast packet in a broadcast sending period before the at least one broadcast receiving period, and wherein the first density threshold is less than the second density threshold.

15. The first terminal of claim 13, wherein the channel environment parameter comprises only the packet sending success rate, wherein the processor being configured to determine the first sending frequency comprises the processor being configured to:
use, as the first sending frequency, a sending frequency higher than a second sending frequency when the packet sending success rate is greater than a first success rate threshold; and
use, as the first sending frequency, a sending frequency lower than a second sending frequency when the packet sending success rate is less than a second success rate threshold; wherein the second sending frequency is for sending a third broadcast packet in a broadcast sending period before the at least one broadcast receiving period, and wherein the first success rate threshold is greater than the second success rate threshold.

16. The first terminal of claim 13, wherein the channel environment parameter comprises the packet time density and the packet sending success rate, wherein the processor being configured to determine the first sending frequency comprises the processor being configured to:
use, as the first sending frequency, a sending frequency higher than a second sending frequency when the packet time density is less than a first density threshold and the packet sending success rate is greater than a first success rate threshold; and
use, as the first sending frequency, a sending frequency lower than a second sending frequency when the packet time density is greater than a second density threshold and/or the packet sending success rate is less than a second success rate threshold, wherein the second sending frequency is for sending a third broadcast packet in a broadcast sending period before the at least one broadcast receiving period, and wherein the first density threshold is less than the second density threshold and the first success rate threshold is greater than the second success rate threshold.

17. The first terminal of claim 13, wherein the processor being configured to determine the first sending frequency comprises the processor being configured to:
determine, according to a frequency parameter sent by each of a plurality of other terminals, a third sending frequency for sending a broadcast packet by each of the plurality of other terminals; and
determine the first sending frequency according to the channel environment parameter, a second sending frequency, and the third sending frequency, and wherein the second sending frequency is for sending a third broadcast packet in a broadcast sending period before the at least one broadcast receiving period.

18. The first terminal of claim 17, wherein the channel environment parameter comprises only the packet time density, wherien the processor being configured to determine the first sending frequency, the second sending frequency, and the third sending frequency of each of the other terminals comprises the processor being configured to:
use, as the first sending frequency, a sending frequency higher than the second sending frequency when the packet time density is less than a third density threshold and the second sending frequency is not higher than the third sending frequency; and
use, as the first sending frequency, a sending frequency lower than the second sending frequency when the packet time density is greater than a fourth density threshold and the second sending frequency is not lower than the third sending frequency, and wherein the third density threshold is less than the fourth density threshold.

19. The terminal of claim 17, wherein the channel environment parameter comprises only the packet sending success rate, wherien the processor being configured to determine the first sending frequency, the second sending frequency, and the third sending frequency comprises the processor being configured to:
use, as the first sending frequency, a sending frequency higher than the second sending frequency when the packet sending success rate is greater than a third success rate threshold and the second sending frequency is not higher than the third sending frequency; and
use, as the first sending frequency, a sending frequency lower than the second sending frequency when the packet sending success rate is less than a fourth success rate threshold and the second sending frequency is not lower than the third sending frequency, and wherein the third success rate threshold is greater than the fourth success rate threshold.

20. The first terminal of claim 17, wherein the channel environment parameter comprises the packet time density and the packet sending success rate, and wherein the processor being configured to determine the first sending frequency, the second sending frequency, and the third sending frequency comprises the processor being configured to:
use, as the first sending frequency, a sending frequency higher than the second sending frequency when the packet time density is less than a third density threshold, the packet sending success rate is greater than a third success rate threshold, and the second sending frequency is not higher than the third sending frequency; and
use, as the first sending frequency, a sending frequency lower than the second sending frequency when the packet time density is greater than a fourth density threshold and/or the packet sending success rate is less than a fourth success rate threshold, and the second sending frequency is not lower than the third sending frequency, and wherein the third density threshold is less than the fourth density threshold and the third success rate threshold is greater than the fourth success rate threshold.

* * * * *

UNITED STATES PATENT AND TRADEMARK OFFICE
CERTIFICATE OF CORRECTION

PATENT NO. : 10,123,296 B2
APPLICATION NO. : 15/519062
DATED : November 6, 2018
INVENTOR(S) : Xiaoping Zhang Page 1 of 1

It is certified that error appears in the above-identified patent and that said Letters Patent is hereby corrected as shown below:

In the Claims

Column 51, Line 57: "paccording" should read "p according"

Column 52, Claim 14 - Line 3: "density, wherien" should read "density, wherein"

Column 54, Line 1: "wherien" should read "wherein"

Column 54, Line 19: "wherien" should read "wherein"

Signed and Sealed this
Eighth Day of January, 2019

Andrei Iancu
*Director of the United States Patent and Trademark Office*